United States Patent
Komiya et al.

(10) Patent No.: US 7,932,823 B2
(45) Date of Patent: Apr. 26, 2011

(54) DISASTER NOTICING SYSTEM, DISASTER NOTICING SERVER, DISASTER REPORTING TERMINAL METHOD, AND PROGRAM

(75) Inventors: Ryosuke Komiya, Tokyo (JP); Hiroaki Kuba, Tokyo (JP); Naoki Kuwamori, Tokyo (JP)

(73) Assignee: NEC Corporation, Tokyo (JP)

( * ) Notice: Subject to any disclaimer, the term of this patent is extended or adjusted under 35 U.S.C. 154(b) by 337 days.

(21) Appl. No.: 12/183,012

(22) Filed: Jul. 30, 2008

(65) Prior Publication Data

US 2009/0284373 A1 Nov. 19, 2009

(30) Foreign Application Priority Data

Jul. 31, 2007 (JP) .................................. 2007-200078

(51) Int. Cl.
G08B 21/00 (2006.01)
(52) U.S. Cl. ..................... 340/540; 340/286.02; 340/601
(58) Field of Classification Search ............. 340/286.02, 340/601, 540, 539.28
See application file for complete search history.

(56) References Cited

U.S. PATENT DOCUMENTS

| | | | | | |
|---|---|---|---|---|---|
| 4,628,299 | A | * | 12/1986 | Tate et al. | 340/540 |
| 5,270,649 | A | * | 12/1993 | Laukien | 324/300 |
| 5,890,094 | A | * | 3/1999 | Zschau | 702/15 |
| 6,169,476 | B1 | * | 1/2001 | Flanagan | 340/286.02 |
| 6,339,747 | B1 | * | 1/2002 | Daly et al. | 702/3 |
| 6,654,689 | B1 | * | 11/2003 | Kelly et al. | 702/3 |
| 6,753,784 | B1 | * | 6/2004 | Sznaider et al. | 340/601 |
| 6,873,265 | B2 | * | 3/2005 | Bleier | 340/690 |
| 7,139,664 | B2 | * | 11/2006 | Kelly et al. | 702/3 |
| 7,584,054 | B2 | * | 9/2009 | Wilcox et al. | 702/3 |
| 7,602,285 | B2 | * | 10/2009 | Sznaider et al. | 340/539.28 |
| 7,681,696 | B2 | * | 3/2010 | Yamagishi | 187/384 |
| 2007/0296575 | A1 | * | 12/2007 | Eisold et al. | 340/539.16 |

FOREIGN PATENT DOCUMENTS

| | | | |
|---|---|---|---|
| JP | 2002-111901 A | | 4/2002 |
| JP | 2005222203 A | | 8/2005 |
| JP | 2005227005 A | * | 8/2005 |
| JP | 2005-315872 A | | 11/2005 |
| JP | 2006-148222 A | | 6/2006 |
| JP | 2006-318003 A | | 11/2006 |
| JP | 200725962 A | | 2/2007 |
| JP | 2007080233 A | * | 3/2007 |
| JP | 2007-161378 A | | 6/2007 |
| JP | 2007147413 A | | 6/2007 |
| JP | 2007-284240 A | | 11/2007 |
| JP | 2009087275 A | * | 4/2009 |
| JP | 2009270949 A | * | 11/2009 |

* cited by examiner

*Primary Examiner* — Eric M Blount
(74) *Attorney, Agent, or Firm* — Sughrue Mion, PLLC

(57) ABSTRACT

The disaster information system according to the invention includes a disaster noticing server and a disaster reporting terminal. The disaster noticing server calculates the expected time of arrival at which the natural disaster will arrive at the current location of the disaster reporting terminal, and transmits the calculated expected time of arrival to the disaster reporting terminal. The disaster reporting terminal, when it receives the expected time of arrival from the disaster noticing server, acquires the current time measured at the disaster reporting terminal, and calculates the time remaining until the natural disaster will arrive at the disaster reporting terminal from the expected time of arrival and the current time.

10 Claims, 14 Drawing Sheets

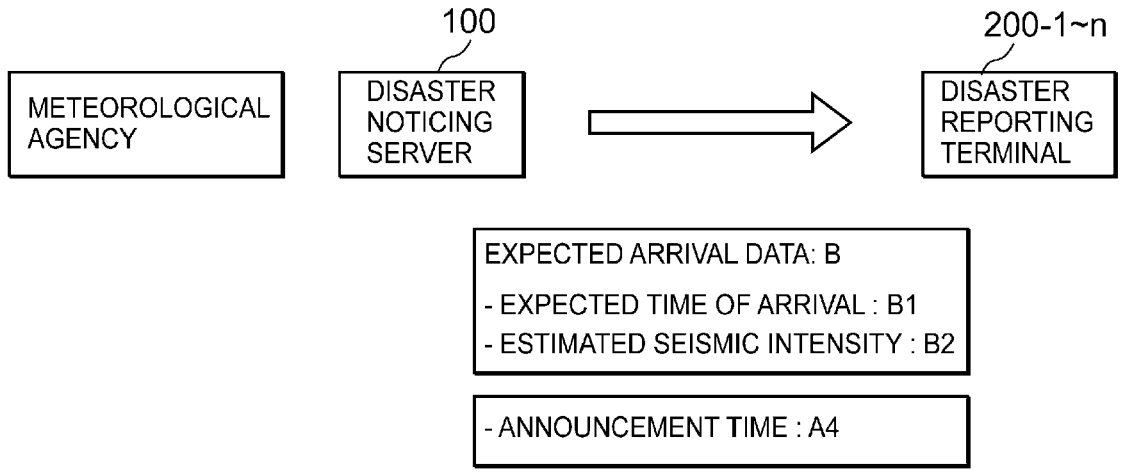
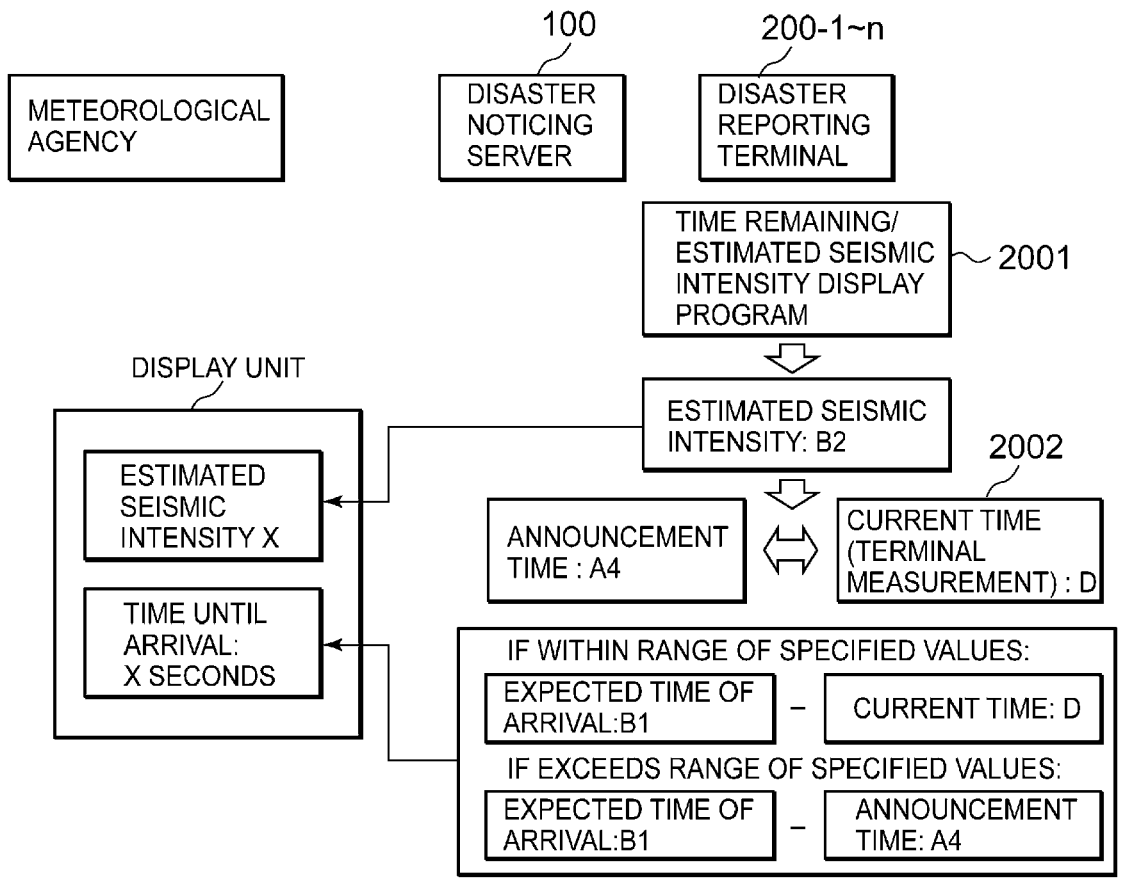

DISASTER NOTICING SYSTEM, DISASTER NOTICING SERVER, DISASTER REPORTING TERMINAL METHOD, AND PROGRAM

BACKGROUND OF THE INVENTION

The present invention relates to a disaster noticing system, disaster noticing server, disaster reporting terminal, method, and program, and more particularly to a disaster noticing system, disaster noticing server, disaster reporting terminal, method, and program suitable for use when a natural disaster such as an earthquake, typhoon, forest fire, subsidence, volcanic ash, avalanche or tsunami, occur.

In order to prevent damage such as mudflows, floods and tsunami that accompany natural phenomena such as typhoons and earthquakes, the Meteorological Agency and Meteorological Observatory give various advice and warnings.

For example, when an earthquake occurs and it is expected that a tsunami will arrive at a certain part of the coastline or area, the Meteorological Agency gives earthquake announcement and/or tsunami warnings before the tsunami arrives.

The mechanism of the earthquake announcement given out by Meteorological Agency will be put to practice. For example, The mechanism notify a magnitude of the earthquake to residents in a specific area within 20 seconds after they occur.

If residents and local authorities receive this information, including earthquake announcements and tsunami warnings, beforehand, they can take steps to reduce the damage due to an earthquake or tsunami. For example, Taking an earthquake as an example, the time required for a tremor occurring at the focus to reach an area where residents are living (affected area) is shorter the closer the residents are to the focus, and longer the further they are from the focus. Also, the estimated seismic intensity of a tremor apparently occurring where residents are living (affected area) will be larger, the larger the magnitude of the earthquake and the closer it is to the focus.

Therefore, when the focus is close to the affected area, we need to notify residents of the expected time of arrival until the tremor generated at the focus reaches the affected area, and to notify them of the correct estimated seismic intensity due to the tremor generated in the focus.

In view of this, JP-A 2007-25962 which belongs to the related art discloses a technique in which the time remaining until a natural phenomena such as an earthquake arrives can be correctly displayed. According to JP-A2007-25962, a PDA receives disaster prevention information and Japan Standard Time, and the time remaining until a natural phenomenon will arrive at the area is calculated from the expected time of arrival and Japan Standard Time.

Due to this, the time remaining until the arrival of a natural phenomenon such as an earthquake can be correctly displayed.

JP-A 2005-222203 discloses a technique whereby real time earthquake information distributed by the Meteorological Agency and the like before the arrival of a main shockwave is transmitted to relevant departments at the Fire Station to reduce the damage due to the earthquake.

According to JP-A 2005-222203, the National Fire Prevention and Control Administration receives the real time earthquake information distributed by the Meteorological Agency, and the real time earthquake information is distributed to the Fire Departments by the National Fire Prevention and Control Administration. Real time earthquake information can thus be distributed to the Fire Departments.

JP-A 2006-318003 discloses a technique of ensuring driver safety and preventing traffic accidents by notifying car drivers of an impending earthquake beforehand. According to JP-A 2006-318003, this technique uses an earthquake information receiver which receives early information including the occurrence time and occurrence location of an earthquake, a GPS receiver which receives the current location and current time, an earthquake information processing unit which calculates the time of arrival of the main shockwave of an earthquake in response to the information from the earthquake information receiver and GPS receiver, and an alarm unit which notifies drivers of the arrival of the earthquake mainly by voice as the output of the earthquake information processing unit. Hence, driver safety can be ensured and traffic accidents can be prevented by notifying drivers of the earthquake's arrival beforehand.

JP-A 2007-147413 discloses a technique of earthquake prediction and assessing the impact of electromagnetic waves by making use of the offset between Standard Time and the time at a terminal.

According to JP-A2007-147413, the offset between the time at the terminal and Standard Time is calculated using internal terminal time information and Standard Time information, and information relating to the offset between Standard Time and the terminal outputs the time. Due to this, by making use of the offset between Standard Time and terminal time, an earthquake can be predicted and the impact of electromagnetic waves and the like can be assessed.

However, according to the above patent documents, the current time measured at the disaster noticing terminal is used, and there is no mention of how to accurately calculate the time remaining until the natural disaster reaches the disaster reporting terminal, nor of the need to do so.

Moreover, if the current time measured at the disaster reporting terminal is not correct, there is no mention of how to calculate the time remaining as accurately as possible, nor of the need to do so.

SUMMARY OF THE INVENTION

An object of the present invention is to provide a disaster noticing system, disaster reporting terminal, method and program that can, by using the current time measured at a announcement terminal, accurately calculate the time remaining until the natural disaster reaches the disaster reporting terminal, and to provide a disaster noticing system, disaster reporting terminal, method and program that can, even if the current time measured at the disaster reporting terminal is incorrect, calculate the time remaining as accurately as possible.

According to one aspect of the present invention, there is therefore provided a disaster noticing system which includes: at least one disaster reporting terminal, and a disaster noticing server that provides the disaster reporting terminal with information relating to the natural disaster. The disaster noticing server, when a natural disaster strikes, calculates an expected time of arrival when the natural disaster will arrive at the disaster reporting terminal, and transmits the expected time of arrival to the disaster reporting terminal. The disaster reporting terminal, when it receives the expected time of arrival, acquires the measured current time, and calculates the time remaining until the natural disaster will arrive at the disaster reporting terminal from the expected time of arrival and the current time.

According to one aspect of the present invention, there is provided a disaster noticing method of a disaster noticing system which includes:
a step in which the disaster noticing server, when a natural disaster has struck, calculates the expected time of arrival when the natural disaster will arrive at the current location of the disaster reporting terminal, a step for transmitting the expected time of arrival to the disaster reporting terminal, a step in which the disaster reporting terminal measures the current time, and a step in which, when the expected time of arrival is received, the measured current time is acquired, and the time remaining until the natural disaster will arrive at the disaster reporting terminal is calculated from the expected time of arrival and the current time.

According to one aspect of the present invention, there is provided a computer readable medium recording thereon a program for enabling a computer to execute:

a function, when a natural disaster has struck, for calculating an expected time of arrival when the natural disaster will arrive at the current location of the disaster reporting terminal, a transmitting function for transmitting the expected time of arrival to the disaster reporting terminal, and a function, when the disaster reporting terminal has received the expected time of arrival, for calculating the time remaining until the natural disaster will reach the disaster reporting terminal from the expected time of arrival and the current time measured at the disaster reporting terminal.

BRIEF DESCRIPTION OF THE DRAWINGS

Other features and advantages of the invention will be made more apparent by the following detailed description and the accompanying drawings, in which:

FIG. 7 is a flow chart for the purpose of describing a sequence of a control routine in the disaster noticing system according to this aspect of the invention.

FIG. 8 is a flow chart for the purpose of describing a sequence of a control routine in the disaster noticing system according to this aspect of the invention.

In the drawings, the same reference numerals represent the same structural elements.

DETAILED DESCRIPTION OF THE PREFERRED EMBODIMENTS

A first embodiment of the present invention will be described in detail below.

Figure 1:
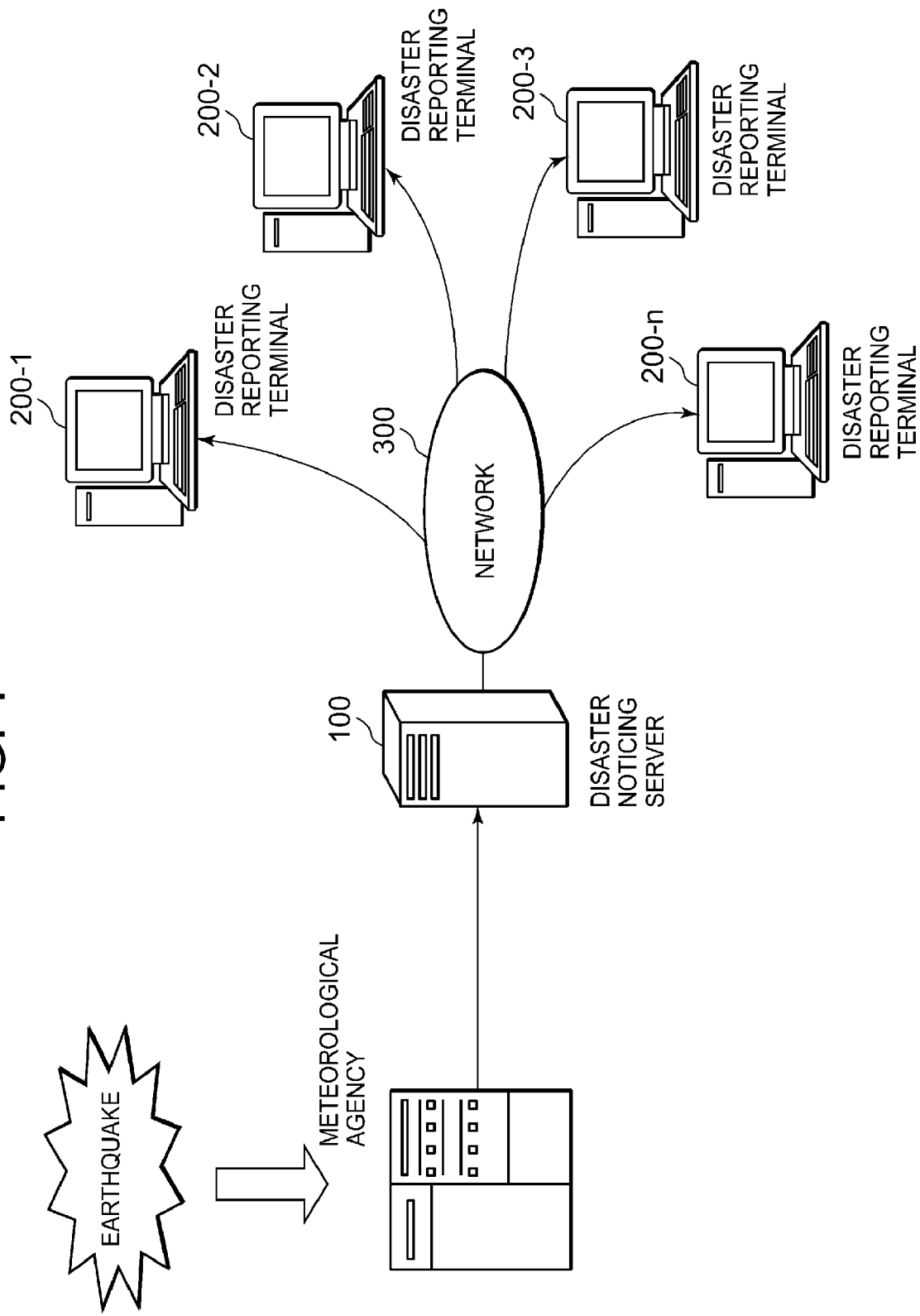
FIG. 1 is a diagram showing the system configuration of a disaster noticing system according to one aspect of the invention.

First, FIG. 1 shows an outline of the disaster noticing system of this embodiment. The disaster noticing system of this embodiment, as shown in FIG. 1, includes at least a disaster reporting terminal (200-1 to 200-$n$: n is an integer), and a disaster noticing server (100) which gives disaster information relating to a natural disaster to the disaster reporting terminal (200-1 to 200-$n$). The disaster noticing server (100), when a natural disaster strikes, calculates the expected time of arrival at which the natural disaster will arrive at the current location of the disaster reporting terminal (200-1 to 200-$n$). The disaster noticing server (100) then transmits the calculated expected time of arrival to the disaster reporting terminal (200-1 to 200-$n$).

The disaster reporting terminal (200-1 to 200-$n$) measures the time, and when it receives the expected time of arrival from the disaster noticing server (100), it acquires the current time measured at the disaster reporting terminal (200-1 to 200-$n$), and calculates the time remaining until the natural disaster reaches the disaster reporting terminal (200-1 to 200-$n$) from the expected time of arrival and the current time. Due to this, by using the current time measured at the disaster reporting terminal (200-1 to 200-$n$), the time remaining until the natural disaster reaches the disaster reporting terminal (200-1 to 200-$n$) can be accurately calculated.

The disaster noticing server (100) also transmits a checking time for checking the accuracy of the time measured at the disaster reporting terminal (200-1 to 200-$n$), to the disaster reporting terminal (200-1 to 200-$n$).

The disaster reporting terminal (200-1 to 200-$n$), when the expected time of arrival and checking time are received from the disaster noticing server (100), acquires the current time measured at the disaster reporting terminal (200-1 to 200-$n$), and calculates the difference between the checking time and current time. The disaster reporting terminal (200-1 to 200-$n$), if the calculated difference does not exceed a predetermined threshold, calculates the time remaining from the expected time of arrival and the current time. The disaster reporting terminal (200-1 to 200-$n$), if the calculated difference does exceed the predetermined threshold, calculates the time remaining from the expected time of arrival and the checking time.

Hence, even if the current time measured at the disaster reporting terminal (200-1 to 200-$n$) is inaccurate, the time remaining can be precisely calculated. The checking time may be for example, the announcement time when the natural disaster was publicly announced, the calculation time at which the disaster noticing server (100) calculated the expected time of arrival, or the notification time when the disaster noticing server (100) notified the expected time of arrival to the disaster reporting terminal (200-1 to 200-n).

Hereafter, the disaster noticing system of this embodiment will be described in detail, referring to the accompanying drawings. The following embodiment is an exemplary embodiment in which the natural disaster is an earthquake. However, the disaster noticing system in this embodiment is not limited for the earthquake described below, and can be also applied to other natural disasters such as a typhoon, forest fire, subsidence, volcanic ash, avalanche, and tsunami. The disaster noticing system according to this embodiment is preferably applied to a disaster notice requiring real time notification.

Figure 2:
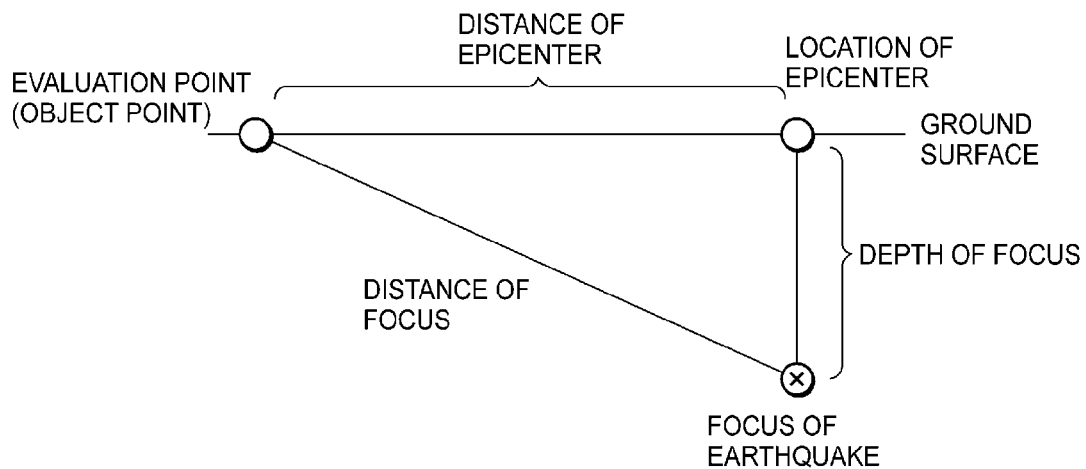
FIG. 2 is a diagram describing terminology relating to earthquakes.

Mechanism for Notifying Expected Arrival Data (Expected Time of Arrival, Estimated Seismic Intensity First, referring to FIG. 2, the mechanism whereby the disaster noticing server (100) notifies the expected arrival data (expected time of arrival, estimated seismic intensity, etc) to the disaster reporting terminal (200-1 to 200-n), will be described. The expected arrival data are data including the expected time of arrivals at which the earthquake will arrive at various locations, and the estimated seismic intensity at various locations (the impact of the earthquake at various locations), when the earthquake occurs.

When an earthquake occurs, after the preliminary tremor (P wave, primary wave) is transmitted, A main shockwave (S wave, Secondary wave) will be transmitted. The main shockwave occurs several seconds to tens of seconds after the preliminary tremor in the disaster area. In general, the damage due to an earthquake is mostly due to the large tremor of the main shockwave. For this reason, it is desirable to acquire information about the focus promptly from the preliminary tremor, and to give expected arrival data to various locations within the several seconds to several tens of seconds before the main shockwave arrives. This is because immediate steps can be taken to reduce the damage, such as extinguishing fires or hiding in a safe place under a desk, before the main shockwave arrives. When an earthquake occurs, for example, and we have acquired information about the location of the epicenter, the focal depth, and the magnitude, as shown in FIG. 2, for example, we can calculate the expected time of arrival until the earthquake (main shockwave) reaches an evaluation point (object point) based on the focal depth, and the distance of the focus (distance between the location of the epicenter, and the evaluation point (object point)). If information about the geology of the evaluation point (object point), etc. is acquired, the estimated seismic intensity at the evaluation point (object point) can be calculated.

Hence, when information about the focus of the earthquake is acquired from the preliminary tremor, we can calculate the expected time of arrival and estimated seismic intensity mentioned above based on positional information and geological information about various locations (object points). It is known that it is difficult to communicate the expected time of arrival promptly and accurately to the various locations. Usually, there is only about several seconds to several tens of seconds until the main shockwave arrives after expected arrival data has been issued. Therefore, even if the system correctly notifies an expected time of arrival (For example, HH:MM:SS HH is hour, MM is minute SS is second) to various locations, unless a terminal which received the expected time of arrival has the correct time down to the last second, the terminal can not know how many seconds remain at various locations. Therefore, it is preferable that the system calculates the expected time of arrival as "number of seconds until the main shockwave arrives", and that this is notified to each location as the "number of seconds" calculated by the system. However, since there is an increase in communication amount and there are communications delays when the earthquake occurs, there will inevitably be a communications delay at each location as compared to the "number of seconds until the main shockwave arrives". Hence, that cause a technical problem how to accurately reproduce the "number of seconds until the main shockwave arrives" at each location.

The Inventor therefore, as a result of trying to make improvements and carrying out intensive research to solve the above problems, developed the disaster noticing system shown in FIG. 1. Specifically, when an earthquake occurs, the disaster noticing server (100) calculates the expected time of arrival when the earthquake will reach the disaster reporting terminals (200-1 to 200-n) in various locations, and transmits the expected time of arrival to the disaster reporting terminals (200-1 to 200-n) in various locations.

The disaster reporting terminals (200-1 to 200-n) in various locations, when they receive the expected time of arrival, acquire the current time measured at the disaster reporting terminals (200-1 to 200-n), and calculate the time remaining until the earthquake will arrive at the disaster reporting terminals (200-1 to 200-n). Hence, by using the current time measured at the disaster reporting terminals (200-1 to 200-n), the (time remaining) until the earthquake will arrive at the location of the disaster reporting terminals can be precisely calculated. Prompt action can thus be taken before the earthquake arrives.

Configuration of Disaster Noticing System

Next, referring to FIG. 1, the system configuration of the disaster noticing system of this embodiment will be described. The disaster noticing system of this embodiment includes a disaster noticing server (100) and a disaster reporting terminal (200-1 to 200-n) connected via a network (300). In the network (300) which constitutes the disaster noticing system of this embodiment, the various devices can communicate with each other by cable or by radio provided that information can be exchanged therebetween. The network (300) is preferably a network that is not easily subject to a delay, such as a company network or a broadband network.

Disaster Noticing Server: 100

The disaster noticing server (100) is an apparatus which gives information about a natural disaster to the disaster reporting terminal (200-1 to 200-n). Specifically, the disaster noticing server (100) acquires data relating to the focus of the earthquake (for example, focal data distributed by the Meteorological Affairs Assistance Center) measured by the Meteorological Agency, and calculates the expected time of arrival when the earthquake will arrive at the current locations of the disaster reporting terminals (200-1 to 200-n) based on the acquired focal data. The disaster noticing server (100), based on the focal data, calculates the estimated seismic intensity at the current locations of the disaster reporting terminals (200-1 to 200-n). The disaster noticing server (100) transmits the expected arrival data including the calculated expected time of arrival and estimated seismic intensity to the disaster reporting terminal (200-1 to 200-n). The disaster noticing server (100) preferably acquires the focal data measured by the Meteorological Agency via a lease line or the like. Due to this, the disaster noticing server (100) can acquire the focal data promptly and surely.

Disaster Reporting Terminal: 200-1 to 200-n

The disaster reporting terminal (200-1 to 200-n) is an apparatus which receives information about a natural disaster from the disaster noticing server (100).

Specifically, the disaster reporting terminal (200-1 to 200-*n*) receives the expected arrival data from the disaster noticing server (100), calculates the time remaining until the earthquake arrives at the current location of the disaster reporting terminal (200-1 to 200-*n*) based on the expected time of arrival included in the expected arrival data, and the calculated time remaining is displayed on a display unit of the disaster reporting terminal (200-1 to 200-*n*). The estimated seismic intensity included in the expected arrival data is also displayed on the display unit. The disaster noticing server (100) and disaster reporting terminal (200-1 to 200-*n*) are computers respectively provided with a communication function, and comprise a CPU, main memory and HDD.

Disaster Noticing Server: 100

Figure 3:
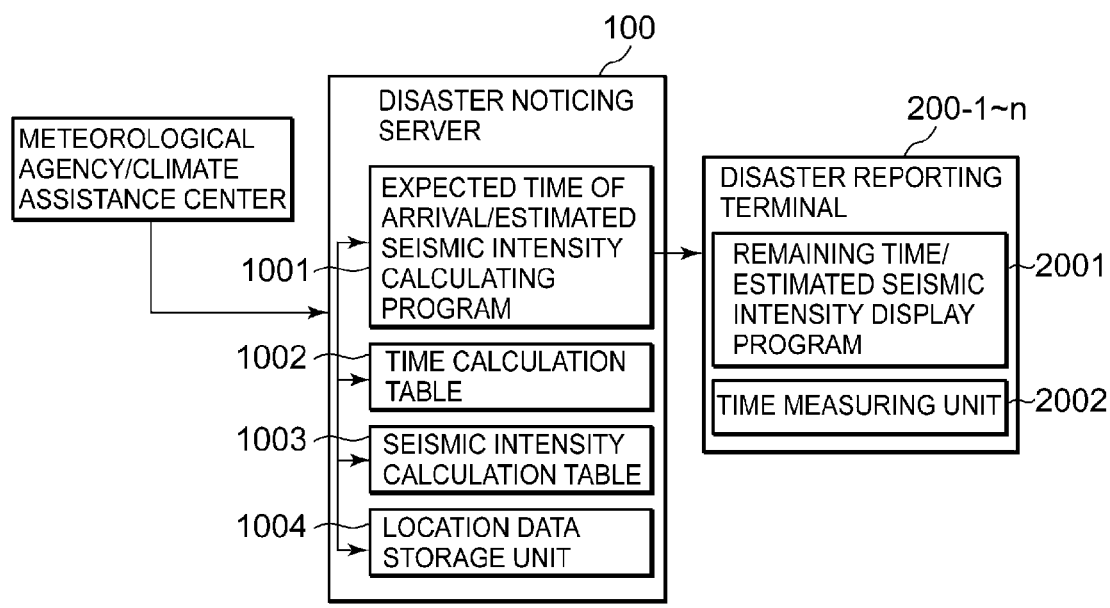
FIG. 3 is a diagram describing a disaster noticing server (100) and a disaster reporting terminal (200 1~n) constituting the disaster noticing system according to this aspect of the invention.

For example, the disaster noticing server (100), as shown in FIG. 3, has an expected time of arrival/estimated seismic intensity calculation program (1001), time calculation table (1002), seismic intensity calculation table (1003), and location data storage unit (1004). The expected time of arrival/estimated seismic intensity calculation program (1001) is a program for calculating the expected time of arrival of the earthquake at various locations, and calculating the estimated seismic intensity of the earthquake at various locations. The expected time of arrival/estimated seismic intensity calculation program (1001) is read from the HDD into the main memory, and data processing is performed by the CPU. The time calculation table (1002) is a table used for calculating the expected time of arrival, and it stores a variety of information for specifying the expected time of arrival. The seismic intensity calculation table (1003) is a table used for calculating the estimated seismic intensity, and it stores a variety of information for specifying the estimated seismic intensity. The location data storage unit (1004) is used for calculating the expected time of arrival and estimated seismic intensity, and it stores location data (latitude/longitude) about the disaster reporting terminal (200-1 to 200-*n*).

The location data storage unit (1004) preferably stores the latest location data for the disaster reporting terminals (200-1 to 200-*n*).

Predetermined storage areas of the HDD or main memory are assigned to the time calculation table (1002), seismic calculation table (1003), and location data storage unit (1004), respectively.

Figure 17:
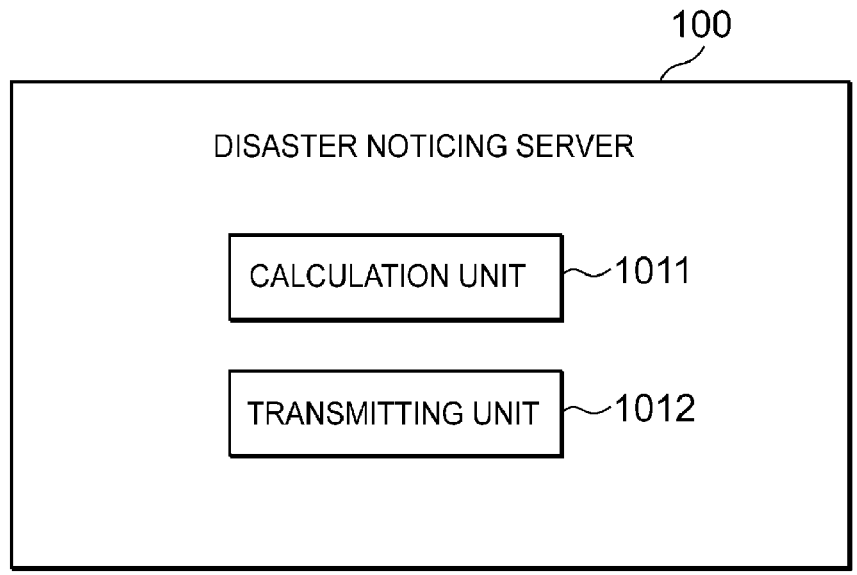
FIG. 17 is a diagram showing the configuration of the disaster noticing server (100) in the disaster noticing system according to this aspect of the invention.

From another point of view, FIG. 17 shows the disaster noticing server (100) by units.

A calculation unit (1011), when a natural disaster occurs, calculates the expected time of arrival at which the natural disaster will arrive at the current location of the disaster reporting terminal (200-1 to 200-*n*). A transmission unit (1012) transmits the expected time of arrival to the disaster reporting terminal (200-1 to 200-*n*). In addition, the transmission unit (1012) may transmit the expected time of arrival and the current time measured at the disaster reporting terminal (200-1 to 200-*n*), to the disaster reporting terminal (200-1 to 200-*n*). In addition, the transmission unit (1012) may transmit a "checking time for checking the accuracy of the current time" used by the disaster reporting terminal (200-1 to 200-*n*), to the disaster reporting terminal (200-1 to 200-*n*).

Disaster Reporting Terminal: 200-1 to 200-*n*

The disaster reporting terminal (200-1 to 200-*n*), as shown in FIG. 3, has a time remaining/estimated seismic intensity display program (2001), and a time measuring unit (2002). The time remaining/estimated seismic intensity display program (2001) is a program for calculating the time remaining based on the expected time of arrival calculated by the disaster noticing server (100), displaying the calculated time remaining, and displaying the estimated seismic intensity calculated by the disaster noticing server (100). The time remaining/estimated seismic intensity display program (2001) is read from the HDD into the main memory, and data processing is performed by the CPU.

The disaster noticing server (100) may have the time remaining/estimated seismic intensity display program (2001) mentioned above for providing the same functions.

The time measuring unit (2002) is an internal timer which measures time. Provided that the time measuring unit (2002) can measure the current time at the disaster reporting terminal (200-1 to 200-*n*), any measurement method may be used, such as for example measuring the current time using physical hardware, or measuring the current time using software.

Figure 18:
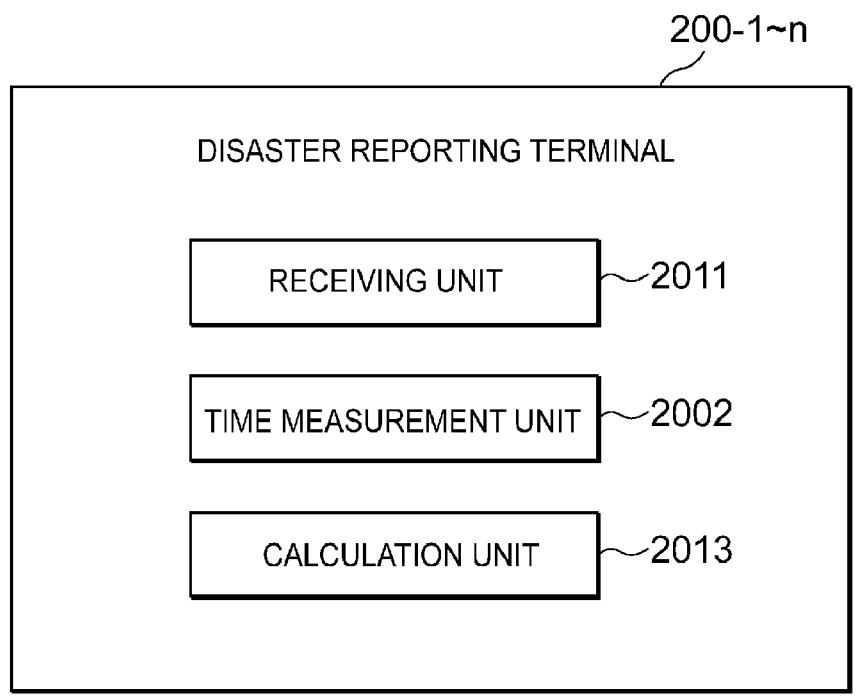
FIG. 18 is a diagram showing a configuration example of a disaster notice terminal (200-1 to 200-$n$) in the disaster noticing system according to this aspect of the invention.

From another point of view, FIG. 18 shows a disaster reporting terminal in units. A receiving unit (2011) receives expected arrival data including the expected time of arrival from the disaster noticing server (100). A time measuring unit (2002) acquires the current time. A calculation unit (2013) calculates the time remaining until the earthquake will arrive at the current location of the disaster reporting terminal (200-1 to 200-*n*) based on the expected time of arrival included in the expected arrival data. The receiving unit (2011) may receive the expected time of arrival and the checking time for checking the accuracy of the time measured by the measuring unit (2012). In addition, the calculation unit (2013) may calculate the difference between the checking time and the current time, when the difference does not exceed a predetermined threshold, may calculate the time remaining from the expected time of arrival and the current time, and when the difference does exceed the predetermined threshold, may calculate the time remaining from the expected time of arrival and the checking time. The disaster reporting terminal (200-1 to 200-*n*) may generally be referred to as a terminal.

Sequence of Routine in Disaster Noticing System

Next, referring to FIGS. 4-9, the sequence of the routine in the disaster noticing system according to this embodiment will be described in detail.

Figure 4:
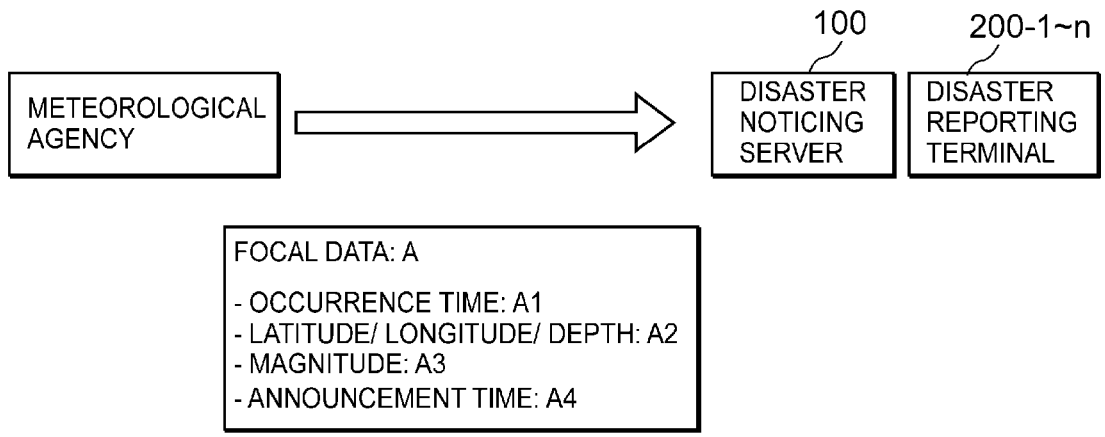
FIG. 4 is a diagram for the purpose of describing a sequence of a control routine in the disaster noticing system according to this aspect of the invention.

When an earthquake occurs, focal data are generally measured by the Meteorological Agency. Earthquake announcements including focal data are provided to the public through the Meteorological Agency, or information-providing organizations such as the Meteorological Assistance Center. The disaster noticing server (100) receives (focal data: A) measured by the Meteorological Agency via a network, as shown in FIG. 4. In this embodiment, as shown in FIG. 4, the (focal data: A) includes the (occurrence time: A1), (latitude, longitude, depth: A2), (magnitude: A3), and the (announcement time: A4). The (occurrence time: A1) is information showing the occurrence time of the earthquake. The (latitude, longitude, depth: A2) is information showing the latitude, longitude, and the focal depth (location of the focus) of the earthquake. The (magnitude: A3) is information showing the magnitude (seismic magnitude). The (announcement time: A4) is information showing the announcement time at which an earthquake announcement, such as focal data, was issued by the Meteorological Agency.

Figure 5:
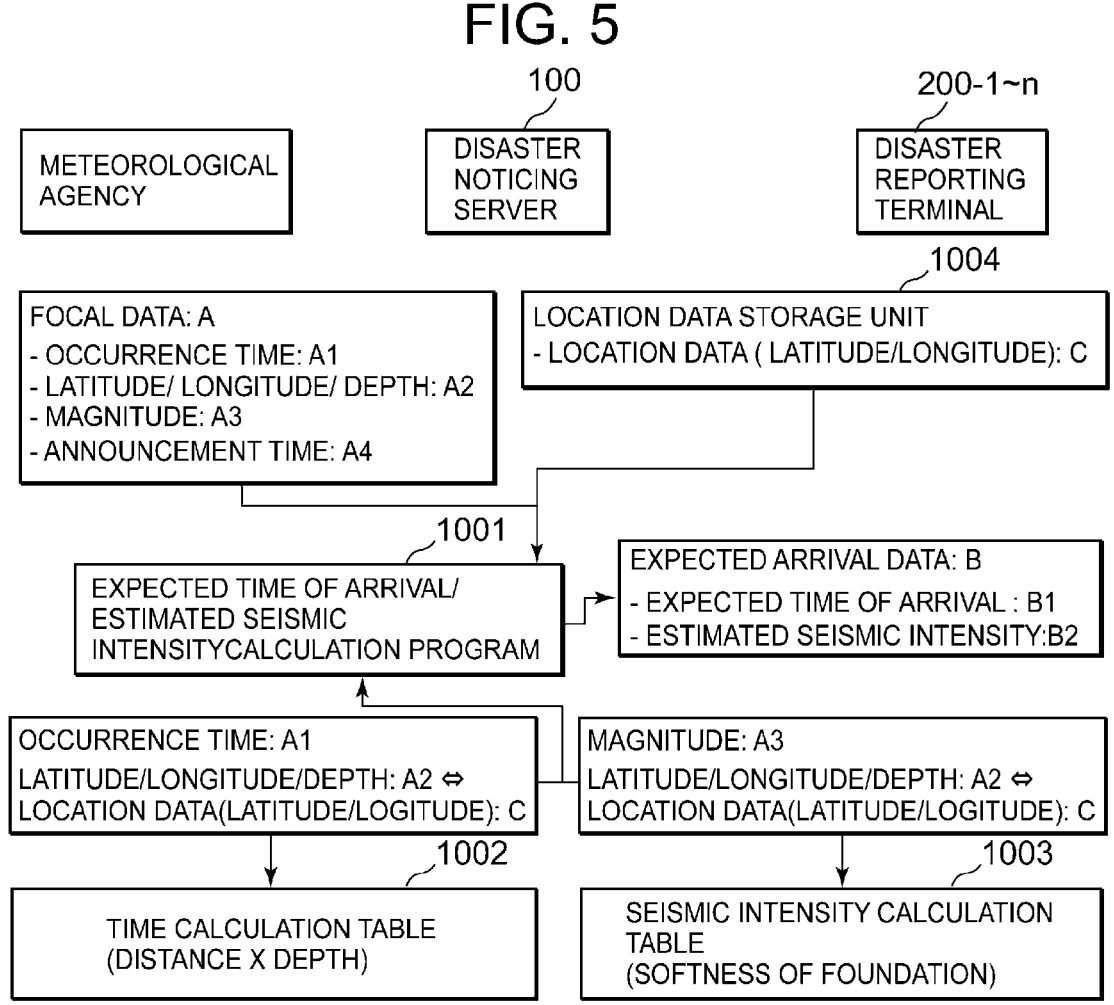
FIG. 5 is a diagram for the purpose of describing a sequence of a control routine in the disaster noticing system according to this aspect of the invention.

When the disaster noticing server (100) receives the (focal data: A), it starts the expected time of arrival/estimated seismic intensity calculation program (1001), and as shown in FIG. 5, it generates (expected arrival data: B) at each location of the disaster reporting terminals (200-1 to 200-*n*). The (expected arrival data: B) includes the (expected time of arrival: B1) and the (estimated seismic intensity: B2). The (expected time of arrival: B1) is information showing the expected time of arrival at which the earthquake will reach each location of the disaster reporting terminals (200-1 to 200-*n*).

The (estimated seismic intensity: B2) is information showing the estimated seismic intensity at each location of the disaster reporting terminals (200-1 to 200-n).

First, the disaster noticing server (100) looks up the location data storage unit (1004), and reads (location data (latitude/longitude): C) about the current location of the disaster reporting terminal (200-1 to 200-n) from the location data storage unit (1004). The (location data (latitude/longitude): C) includes information about the latitude and longitude of the current location of the disaster reporting terminal (200-1 to 200-n). The disaster noticing server (100) calculates the distance from the focus to the current location of the disaster reporting terminal (200-1 to 200-n) based on the (location data (latitude and longitude): C) and the focal latitude/longitude included in the (focal data: A) (part of (latitude, longitude, depth: A2)). The time calculation table (1002) stores information which can specify the expected time of arrival based on the distance from the focus and the focal depth. For this purpose, the disaster noticing server (100) looks up the time calculation table (1002), and specifies the expected time of arrival when the earthquake will arrive at the current location of the disaster reporting terminal (200-1 to 200-n) based on the distance from the focus to the current location of the disaster reporting terminal (200 1~n), and the information about the focal depth included in the (focal data: A) (part of (latitude, longitude, depth: A2)), which were calculated above. The table form at of the time calculation table (1002) is not particularly limited, the time calculation table (1002) can be constituted using any information which can specify the expected time of arrival when the earthquake will arrive at the current location of the disaster reporting terminal (200-1 to 200-n).

Next, the disaster noticing server (100), based on the (occurrence time: A1) included in the (focal data: A), adds the above specified expected time of arrival to the (occurrence time: A1), and calculates the (expected time of arrival: B1) when the earthquake will arrive at the current location of the disaster reporting terminal (200-1 to 200-n) (expected time of arrival: B1=occurrence time: A1+expected time of arrival).

The seismic intensity calculation table (1003) includes information that can specify the (estimated seismic intensity: B2) at the current location of the disaster reporting terminal (200-1 to 200-n). that information is specified by the distance from the focus to the current location of the disaster reporting terminal (200-1 to 200-n), geological information about the area from the focus to the current location of the disaster reporting terminal (200-1 to 200-n), and the (magnitude: A3) included in the (focal data A). For this purpose, the disaster noticing server (100) looks up the seismic calculation table (1003), and specifies the estimated seismic intensity: B2 at the current location of the disaster reporting terminal (200-1 to 200-n) based on the (location data (latitude/longitude): C) of the disaster reporting terminal (200-1 to 200-n), the focal latitude/longitude included in the (focal data: A) (part of (latitude/longitude/depth: A2)), and the (magnitude: A3) included in the (focal data: A). The table format of the time calculation table (1003) is not particularly limited. The time calculation table (1003) can be constituted using any information which can specify the (estimated seismic intensity: B2) at the current location of the disaster reporting terminal (200-1 to 200-n).

Figure 6:
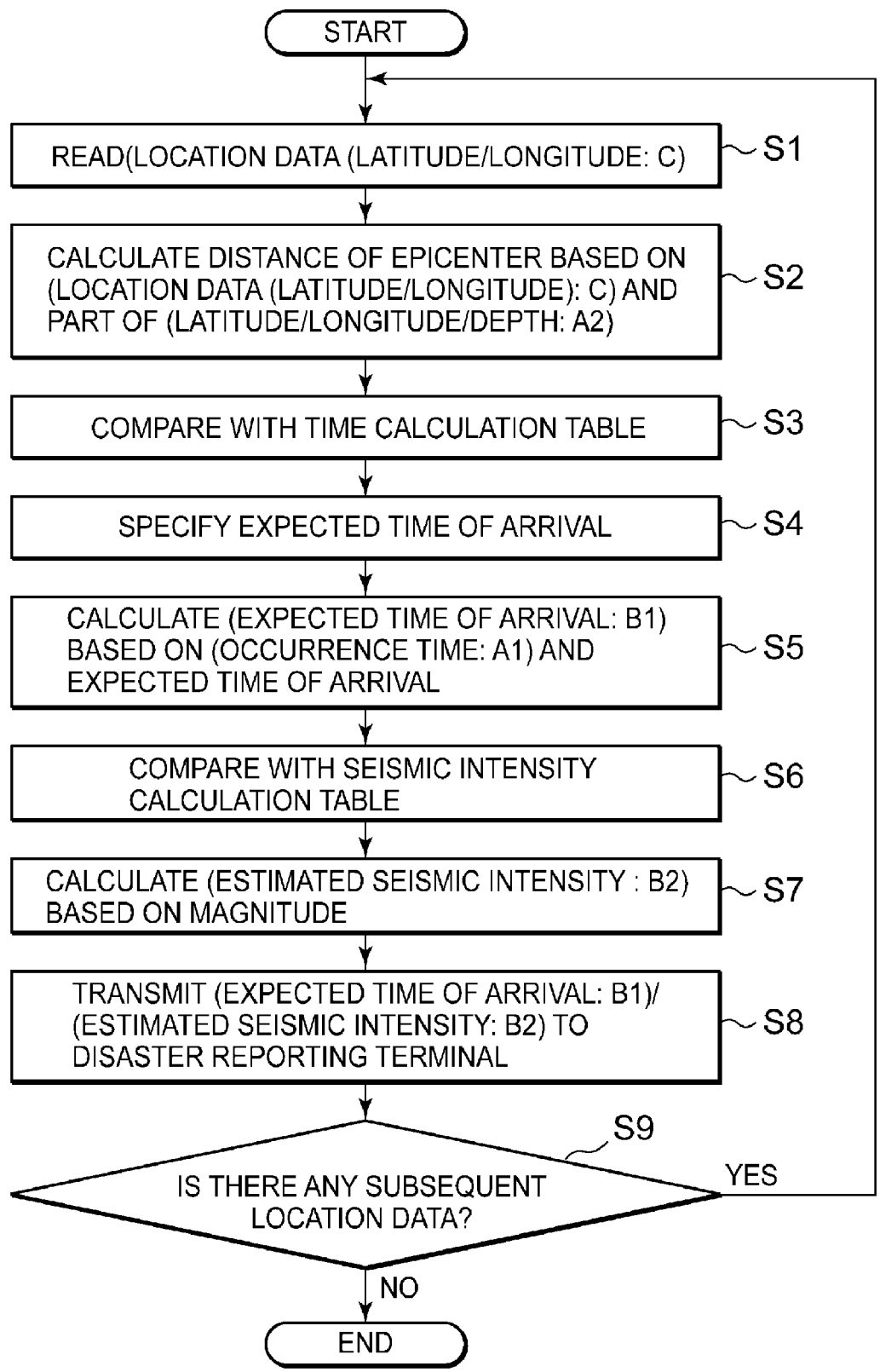
FIG. 6 is a flow chart for the purpose of describing a sequence of a control routine in the disaster noticing system according to this aspect of the invention.

The (estimated seismic intensity: B2) at the current location of the disaster reporting terminal (200-1 to 200-n) can be specified by other method. For example, the (estimated seismic intensity: B2) may also be specified by multiplying the seismic intensity estimated based on the distance between the current location of the disaster reporting terminal (200-1 to 200-n) which is an object point (evaluated point) and the focus, and the (magnitude: A3) included in the (focal data: A), by a foundation amplification factor based on an attenuation factor. FIG. 6 shows the routine when the (expected arrival data: B) shown in FIG. 5 is generated. Hereafter, the routine when the (expected arrival data: B) is generated will be described, referring to FIG. 5 and FIG. 6.

First, the disaster noticing server (100) reads the (location data (latitude/longitude): C) of the disaster reporting terminal (200-1 to 200-n) from the location data storage unit (1004) (Step S1). Next, the disaster noticing server (100) calculates the distance from the focus to the current location of the disaster reporting terminal (200-1~n) based on the (location data) (latitude/longitude: C) read in the step S1 and information about the focal latitude/longitude included in the (focal data: A) (part of (latitude/longitude/depth: A2)) (step S2).

Next, the disaster noticing server (100) looks up the time calculation table (1003) (step S3), and specifies the expected time of arrival when the earthquake will arrive at the current location of the disaster reporting terminal (200-1 to 200-n) based on the focal distance calculated in the step S2, and the information about the focal depth included in the (focal data: A) (part of (latitude, longitude, depth: A2)) (step S4). Next, the disaster noticing server (100) adds the expected time of arrival specified in the Step S4 to the (occurrence time: A1) included in the (focal data: A), and calculates (the expected time of arrival: B1) when the earthquake will arrive at the current location of the disaster reporting terminal (200-1 to 200-n) (expected time of arrival: B1=occurrence time: A1+expected time of arrival) (step S5). The disaster noticing server (100) also looks up the seismic calculation table (1003) (step S6), and calculates the (estimated seismic intensity: B2) at the current location of the disaster reporting terminal (200-1 to 200-n) based on the (location data (latitude/longitude): C) of the disaster reporting terminal (200-1 to 200-n), the information about the focal latitude/longitude included in the (focal data: A (part of latitude/longitude/depth: A2)), and the (magnitude: A3) (step S7).

Next, the disaster noticing server (100) transmits the (expected arrival data: B) including the (expected time of arrival: B1) calculated in the Step S5 and the (estimated seismic intensity: B2) calculated in the step S7, to the disaster reporting terminal (200-1 to 200-n) whose (location data (latitude/longitude): C) is read from the location data storage unit (1004) in the Step S1 (Step S8).

Next, the disaster noticing server (100) determines whether there is subsequent (location data (latitude and longitude): C) (Step S9), and when there is subsequent (location data (latitude/longitude): C) (Step S9/YES), the routine goes to the Step S1, and the processing from the Step S1-Step S8 is repeated (Step S1-Step S8). The disaster noticing server (100), when there is no subsequent (location data (latitude/longitude): C) (Step S9/No), terminates the routine (END). The method of determining whether there is any (location data (latitude/longitude): C) in the Step S9 is not particularly limited. Any determining method can be specified that determines whether the (expected arrival data: B) is transmitted to all the disaster reporting terminals (200-1 to 200-n).

For example, it may be determined whether the (location data (latitude and longitude): C) was read from the location data storage unit (1004). Or, the disaster reporting terminals (200-1 to 200-n) at locations thought to be affected by an earthquake occurring at the focus may be specified, based on the (location data (latitude/longitude): C) of the disaster reporting terminals (200-1 to 200-n) stored by the location data storage unit (1004), and the (latitude, longitude, depth: A2) and (magnitude: A3) included in the (focal data A), and it may be determined whether all the (location data (latitude/longitude): C) of the specified disaster reporting terminals (200-1 to 200-$n$) was read. The disaster noticing server (100), based on the expected time of arrival/estimated seismic intensity computation program (1001), performs the sequence of steps shown in FIG. 5 and FIG. 6 mentioned above repeatedly. The disaster noticing server (100) transmits the expected arrival data: B generated by the aforementioned processing to the disaster reporting terminals (200-1 to 200-$n$), as shown in FIG. 7.

The disaster noticing server (100) transmits this information to the disaster reporting terminal (200-1 to 200-$n$) with the (announcement time: A4) at which an earthquake announcement was announced by the Meteorological Agency, as shown in FIG. 7. The disaster reporting terminal (200-1 to 200-$n$), when the (expected arrival data: B) and the (announcement time: A4) are received, starts the remaining time/estimated seismic intensity display program (2001), and displays the time remaining until the earthquake arrives (X seconds until arrival) and the estimated seismic intensity (estimated seismic intensity x) on the display unit, as shown in FIG. 8. For example, the (estimated seismic intensity: B2) included in the expected arrival data: B is displayed on the display unit as it is in the form (estimated seismic intensity x). Regarding the time remaining to earthquake arrival, the current time measured by the disaster reporting terminal (200-1 to 200-$n$) is used, the (current time: D) measured by the disaster reporting terminal (200-1 to 200-$n$) is subtracted from the (expected time of arrival: B1) included in the (expected arrival data: B), the (time remaining) to arrival is calculated (time remaining=expected time of arrival: B−current time: D), and the calculated (time remaining) is displayed on the display unit. In order that the disaster reporting terminal (200-1 to 200-$n$) may determine the accuracy of the time measured by the disaster reporting terminal (200-1 to 200-$n$), the difference between the (announcement time: A4) received from the disaster noticing server (100) and the (current time: D) measured by the disaster reporting terminal (200-1 to 200-$n$), is calculated (difference=|announcement time: A4−current time: D|), and it is determined whether the calculated difference exceeds a specified value (permitted number of seconds error is set) (difference>specified value).

The disaster reporting terminal (200-1 to 200-$n$), when the calculated difference does not exceed the specified value, determines that the time measured by the disaster reporting terminal (200-1 to 200-$n$) accurate. The disaster reporting terminal (200-1 to 200-$n$), using the expected time of arrival: B1 received from the disaster noticing server (100) and the (current time: D) measured by the disaster reporting terminal (200-1 to 200-$n$), subtracts the (current time: D) from the (expected time of arrival: B1), and calculates the difference as the (time remaining) until the earthquake arrives (time remaining=time remaining: B1−current time: D). The disaster reporting terminal (200-1 to 200-$n$) then displays the (time remaining) calculated above in the form of, for example, (X seconds until arrival) on the display unit.

Figure 9:
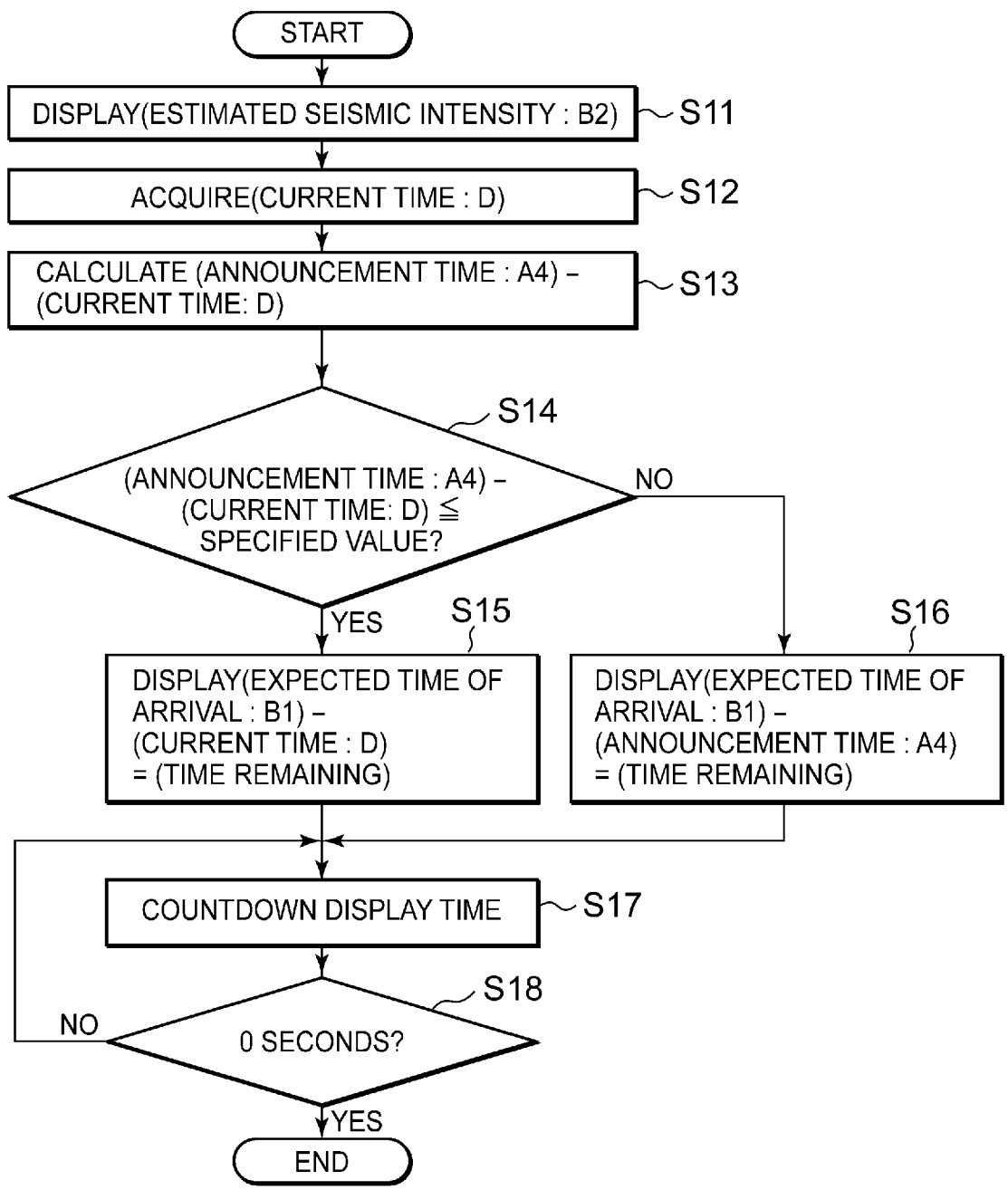
FIG. 9 is a flow chart for the purpose of describing a sequence of a control routine in the disaster noticing system according to this aspect of the invention.

The disaster reporting terminal (200-1 to 200-$n$), when the calculated difference does exceed the specified value (difference>specified value), determines that they are mismatched and there is an offset in the time measured by the disaster reporting terminal (200-1 to 200-$n$). The disaster reporting terminal (200-1 to 200-$n$), using the (expected time of arrival: B1) received from the disaster noticing server (100) and the (announcement time: A4), subtracts the (announcement time: A4) from the (expected time of arrival: B1) and calculates the difference as the (time remaining) until the earthquake arrives (time remaining=time remaining: B1−announcement time: A4). The disaster reporting terminal (200-1 to 200-$n$) then displays the (time remaining) calculated above in the form of, for example, (X seconds until arrival) on the display unit. According to the time measured by the disaster reporting terminal (200-1 to 200-$n$), the (time remaining) displayed on the display unit is decremented each second until the display is 0 seconds, i.e., the (time remaining) is counted down. FIG. 9 shows the display flow of the time remaining and estimated seismic intensity shown in FIG. 8 mentioned above. Hereafter, the routine when the time remaining/estimated seismic intensity is displayed on the display unit will be described, referring to FIG. 8 and FIG. 9.

First, when the (expected arrival data: B) and (announcement time: A4) are received (Step S11), the disaster reporting terminal (200-1 to 200-$n$) displays the (estimated seismic intensity: B2) included in (the expected arrival data: B) on the display unit. Next, the disaster reporting terminal (200-1 to 200-$n$) acquires the (current time: D) measured by the disaster reporting terminal (200-1 to 200-$n$) (Step S12). Next, the disaster reporting terminal (200-1 to 200-$n$) calculates the difference between the (announcement time: A4) received from the disaster noticing server (100) and the (current time: D) measured by the disaster reporting terminal (200-1 to 200-$n$), (difference=|announcement time: A4−current time: D|) (Step S13), and determines whether the difference calculated in the Step S13 exceeds a specified value (permitted number of seconds error is set) (difference≦specified value?) (Step S14). The disaster reporting terminal (200-1 to 200-$n$), when the difference calculated in the step S13 does not exceed the specified value (difference≦specified value) (step S14/Yes), determines that the time measured by the disaster reporting terminal (200-1 to 200-$n$) is accurate. The disaster reporting terminal (200-1 to 200-$n$), using the (expected time of arrival: B1) received from the disaster noticing server (100) and the (current time: D) measured by the disaster reporting terminal (200-1 to 200-$n$), subtracts the (current time: D) from the (expected time of arrival: B1), and calculates the difference as the (time remaining) until the earthquake arrives (time remaining=time remaining: B1−current time: D). The disaster reporting terminal (200-1 to 200-$n$) then displays the (time remaining) calculated above in the form of, for example, (X seconds until arrival) on the display unit (step S15).

The disaster reporting terminal (200-1 to 200-$n$), when the calculated difference does exceed the specified value (difference>specified value) (step S14/No), determines that the time measured by the disaster reporting terminal (200-1 to 200-$n$) has an offset. The disaster reporting terminal (200-1 to 200-$n$), using the (expected time of arrival: B1) received from the disaster noticing server (100) and the (announcement time: A4), subtracts the (announcement time: A4) from the (expected time of arrival: B1), and calculates the difference as the (time remaining) until the earthquake arrives (time remaining=time remaining: B1−announcement time: A4).

The disaster reporting terminal (200-1 to 200-$n$) then displays the (time remaining) calculated above in the form of, for example, (X seconds until arrival) on the display unit (step S16).

Next, the disaster reporting terminal (200-1 to 200-$n$) counts down the display time displayed on the display unit (Step S17), and determines whether the time remaining has become 0 (Step S18). The disaster reporting terminal (200-1 to 200-$n$) counts down the display time until the time remaining becomes 0, (Step S18/No Step S17), and when the time remaining is 0, (Step S18/Yes), terminates processing (END).

Hence, the disaster noticing server (100) of the disaster information system of this embodiment, when an earthquake occurs, calculates the (expected time of arrival: B1) when the earthquake will arrive at the current location of the disaster reporting terminal (200-1 to 200-n). It also calculates the (estimated seismic intensity: B2) which the earthquake generates at the current location of the disaster reporting terminal (200-1 to 200-n). The disaster noticing server (100) then transmits the (expected arrival data: B) including the (expected time of arrival: B1) and the (estimated seismic intensity: B2) calculated above, and the (announcement time: A4) at which the earthquake announcement was announced, to the disaster reporting terminal (200-1 to 200-n). When the disaster reporting terminal (200-1 to 200-n) receives the (expected arrival data: B) and (announcement time: A4), it acquires the (current time: D) measured at the disaster reporting terminal (200-1 to 200-n), and calculates the difference between the (announcement time: A4) and the (current time: D) (difference=|announcement time: A4−current time: D). The disaster reporting terminal (200-1 to 200-n), when the difference calculated above does not exceed the default value (difference≦default value), determines that the time measured by the disaster reporting terminal (200-1 to 200-n) is accurate. The disaster reporting terminal (200-1 to 200-n) subtracts the (current time: D) from the (expected time of arrival: B1), and calculates the difference as a (time remaining) until an earthquake arrives (time remaining=expected time of arrival: B1−current time: D). The disaster reporting terminal (200-1 to 200-n) then displays the (time remaining) calculated above on the display unit.

Hence, by using the (current time: D) measured at the disaster reporting terminal (200-1 to 200-n), the (time remaining) until the natural disaster arrives at the disaster reporting terminal (200-1 to 200-n) can be accurately calculated.

The disaster reporting terminal (200-1 to 200-n), when the calculated difference does exceed the specified value, determines that the time measured by the disaster reporting terminal (200-1 to 200-n) has an offset. The disaster reporting terminal (200-1 to 200-n) subtracts the (announcement time: A4) from the (expected time of arrival: B1), and calculates the difference as the (time remaining) until the earthquake arrives (time remaining=expected time of arrival: B1−announcement time: A4). The disaster reporting terminal (200-1 to 200-n) then displays the (time remaining) calculated above on the display unit. Thereby, even when the (current time: D) measured at the disaster reporting terminal (200-1 to 200-n) is inaccurate, the (time remaining) can be calculated as accurately as possible using the precise (announcement time: A4) at which an earthquake announcement, such as focal data, was issued by the Meteorological Agency. The (time remaining) can also be calculated without using the Network Time Protocol (NTP) or Global Positioning System (GPS), etc., at each disaster reporting terminal (200-1 to 200-n).

The time used when the current time measured by the disaster reporting terminal (200-1 to 200-n) has an offset, is not limited to the (announcement time: A4) mentioned above. For example, a (calculation time) when the (expected time of arrival: B1) and (estimated seismic intensity: B2) are calculated at the disaster noticing server (100), or a (noticing time), etc., when the (expected time of arrival: B1) and (estimated seismic intensity: B2) are notified by the disaster noticing server (100), may also be used.

Figure 10:
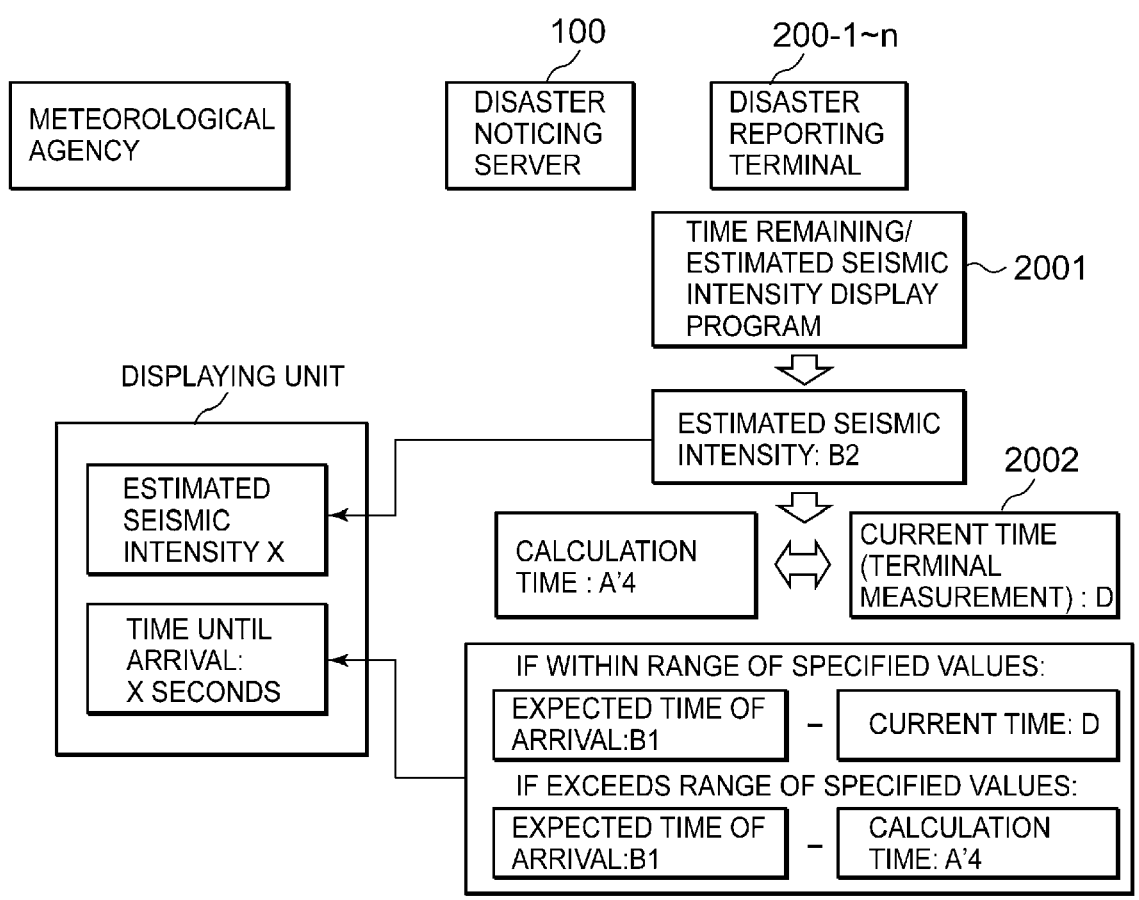
FIG. 10 is a diagram showing an estimated seismic intensity: B2 and a time remaining on a display unit.
Figure 11:
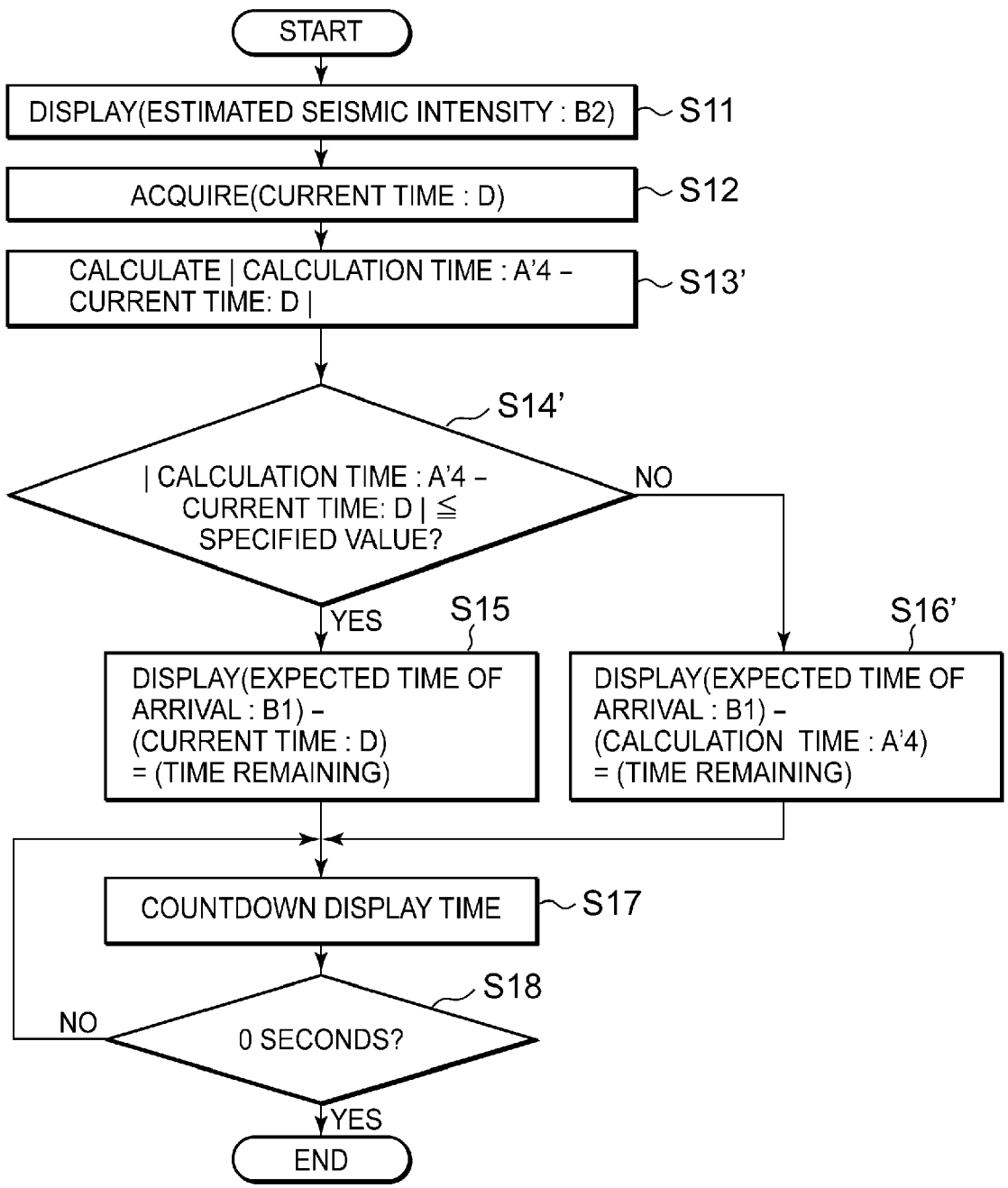
FIG. 11 is a flow chart showing a routine when the estimated seismic intensity: B2 and the time remaining are displayed on the display unit.
Figure 12:
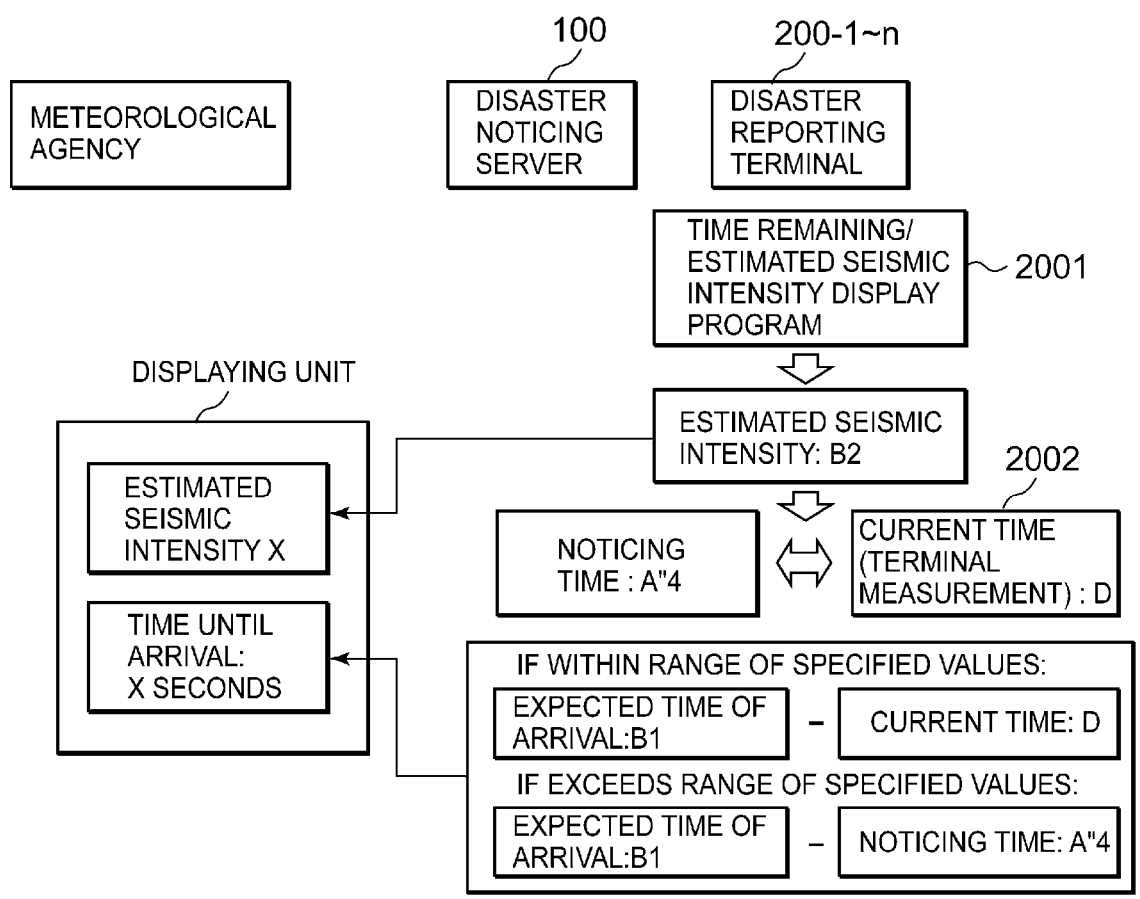
FIG. 12 is a diagram showing the estimated seismic intensity: B2 and the time remaining on the display unit.
Figure 13:
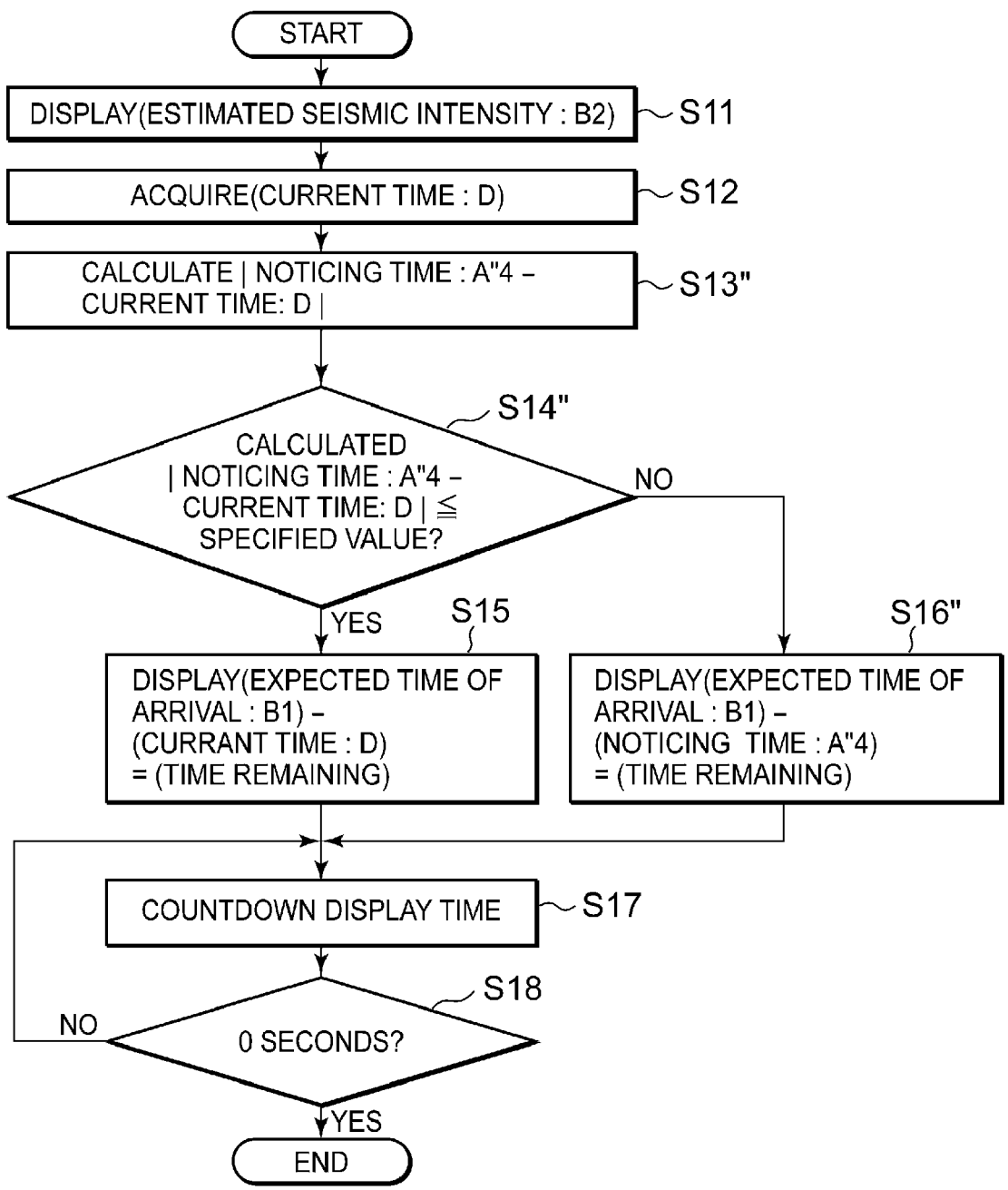
FIG. 13 is a flow chart showing a routine when the estimated seismic intensity: B2 and the time remaining are displayed on the display unit.

FIG. 10 and FIG. 11 show the display flow of the time remaining/estimated seismic intensity when a (calculation time: A'4), i.e., the (expected time of arrival: B1) and (estimated seismic intensity: B2) calculated at the disaster noticing server (100), is used instead of the (announcement time: A4) mentioned above. FIG. 12 and FIG. 13 show the display flow of the time remaining/estimated seismic intensity when a (noticing time: A"4), i.e., the time at which the (expected time of arrival: B1) and (estimated seismic intensity: B2) were notified by the disaster noticing server (100), is used instead of the (announcement time: A4) mentioned above. As the (calculation time: A'4), the time when the (expected time of arrival: B1) is calculated in the step S5 shown in FIG. 6, or the time when the (estimated seismic intensity: B2) is calculated in the step S7 shown in FIG. 6, may be used. In this case, the disaster noticing server (100) transmits the aforesaid (calculation time: A'4) to the disaster reporting terminal (200-1 to 200-n) instead of the (announcement time: A4) shown in FIG. 7. The disaster reporting terminal (200-1 to 200-n) then performs the display processing of the time remaining/estimated seismic intensity shown in FIG. 10 and FIG. 11 using the above (calculation time: A'4) instead of the (announcement time: A) mentioned above. Specifically, the disaster reporting terminal (200-1 to 200-n) calculates the difference between the calculation time: A'4 received from the disaster noticing server (100) and the (current time: D) measured by the disaster reporting terminal (200-1 to 200-n) (difference=|calculation time: A'4−current time: D|) (Step S'13), as shown in FIG. 11, and determines whether the difference calculated in the Step S'13 exceeds a specified value (permitted number of seconds error is set) (if difference≦specified value) (step S'14). The disaster reporting terminal (200-1 to 200-n), when the difference calculated in the Step S'13 exceeds the specified value (difference>specified value) (Step S'14/No), determines that the time measured by the disaster reporting terminal (200-1 to 200-n) has an offset. The disaster reporting terminal (200-1 to 200-n), using the expected time of arrival: B1 received from the disaster noticing server (100) and the (calculation time: A'4), subtracts the (calculation time: A'4) from the (expected time of arrival: B1), and calculates the difference as the (time remaining) until the earthquake arrives (time remaining=expected time of arrival: B1−calculation time: A'4). The disaster reporting terminal (200-1 to 200-n) then displays the (time remaining) calculated above in the form of, for example, (X seconds until arrival) on the display unit. (Step S'16)

As the (noticing time: A"), the time when the (expected time of arrival: B1) and (estimated seismic intensity: B2) in Step S8 shown in FIG. 6 are transmitted, can be used. In this case, the disaster noticing server (100) transmits the aforesaid (noticing time: A") to the disaster reporting terminal (200-1 to 200-n) instead of the (announcement time: A4) shown in FIG. 7. The disaster reporting terminal (200-1 to 200-n) then performs display processing of the time remaining/estimated seismic intensity shown in FIG. 12 and FIG. 13 using the above mentioned noticing time: A"4 instead of the aforesaid (announcement time: A). Specifically, the disaster reporting terminal (200-1 to 200-n) calculates the difference between the (noticing time: A"4) received from the disaster noticing server (100) and the (current time: D) measured by the disaster reporting terminal (200-1 to 200-n), as shown in FIG. 13 (difference=|noticing time: A"4−current time: D|) (Step S"13), and it is determined whether the difference calculated by the Step S"13 exceeds a specified value (permitted number of seconds error is set) (if difference≦specified value) (step S"14). The disaster reporting terminal (200-1 to 200-n), when the difference calculated in the step 13 exceeds the specified value (difference>specified value) (Step S"14/No), determines that the time measured by the disaster reporting terminal (200-1 to 200-n) has an offset. The disaster reporting terminal (200-1 to 200-n), using the expected time of arrival: B1 received from the disaster noticing server (100) and the (noticing time: A"4), subtracts the (noticing time: A"4) from the (expected time of arrival: B1), and calculates the difference as the (time remaining) until the earthquake arrives (time remaining=expected time of arrival: B1−noticing time: A"4). The disaster reporting terminal (200-1 to 200-*n*) then displays the (time remaining) calculated above in the form of, for example, (X seconds until arrival) on the display unit (step S"16).

Hence, by using the (calculation time: A"4) and (noticing time: A"4) instead of the (announcement time: A4) mentioned above, the error in the (time remaining) due to communication delay between the disaster noticing server (100) and disaster reporting terminal (200-1 to 200-*n*) is reduced, and an accurate (time remaining) can be calculated.

As shown in FIG. 6, in the Step S5, the (expected time of arrival: B1/estimated seismic intensity: B2) can be calculated for each disaster reporting terminal (200-1 to 200-*n*), and this calculated (expected time of arrival: B1/estimated seismic intensity: B2) can be transmitted in the Step S8.

In this case, since the time between the (calculation time: A'4) and (noticing time: A"4) (time from the Step S5 to the Step S8) is relatively short, there is not much error when the (time remaining) is calculated whichever of the (calculation time: A'4) and (noticing time: A"4) is used. However, if the calculation of the (expected time of arrival: B1/estimated seismic intensity: B2) is performed in parallel for plural disaster reporting terminals (200-1 to 200-*n*) in the Step S5, and if the calculated (expected time of arrival: B1/estimated seismic intensity: B2) is transmitted in parallel to plural disaster reporting terminals (200-1 to 200-*n*) in the Step S8, the time between the (calculation time: A'4) and (noticing time: A"4) (time from the Step S5 to the Step S8) will increase. As a result, the error in calculating the (time remaining) will increase. For this reason, when performing calculation of the (expected time of arrival: B1/estimated seismic intensity: B2) in parallel for plural disaster reporting terminals (200-1 to 200-*n*), an accurate (time remaining) can be calculated by using the (noticing time: A"4) rather than the (calculation time: A'4).

When there is an offset in the current time measured by the disaster reporting terminal (200-1 to 200-*n*), any of the (announcement time: A4), (calculation time: A'4) and (noticing time: A"4) may be selectively set, and the set time transmitted to the disaster reporting terminal (200-1 to 200-*n*). For example, when there is an offset in the current time measured by the disaster reporting terminal (200-1 to 200-*n*), any of the (announcement time: A4), (calculation time: A'4) and (noticing time: A"4) may be set at the disaster noticing server (100) by a manual operation. The disaster noticing server (100) transmits the set time to the disaster reporting terminal (200-1 to 200-*n*) with the (expected arrival data: B). Alternatively, for example, when there is an offset in the current time measured by the disaster reporting terminal (200-1 to 200-*n*), any of the (announcement time: A4), (calculation time: A'4) and (noticing time: A"4) may be set at the disaster noticing server (100) automatically. The disaster noticing server (100) then transmits the set time to the disaster reporting terminal (200-1 to 200-*n*) with the (expected arrival data: B).

Figure 14:
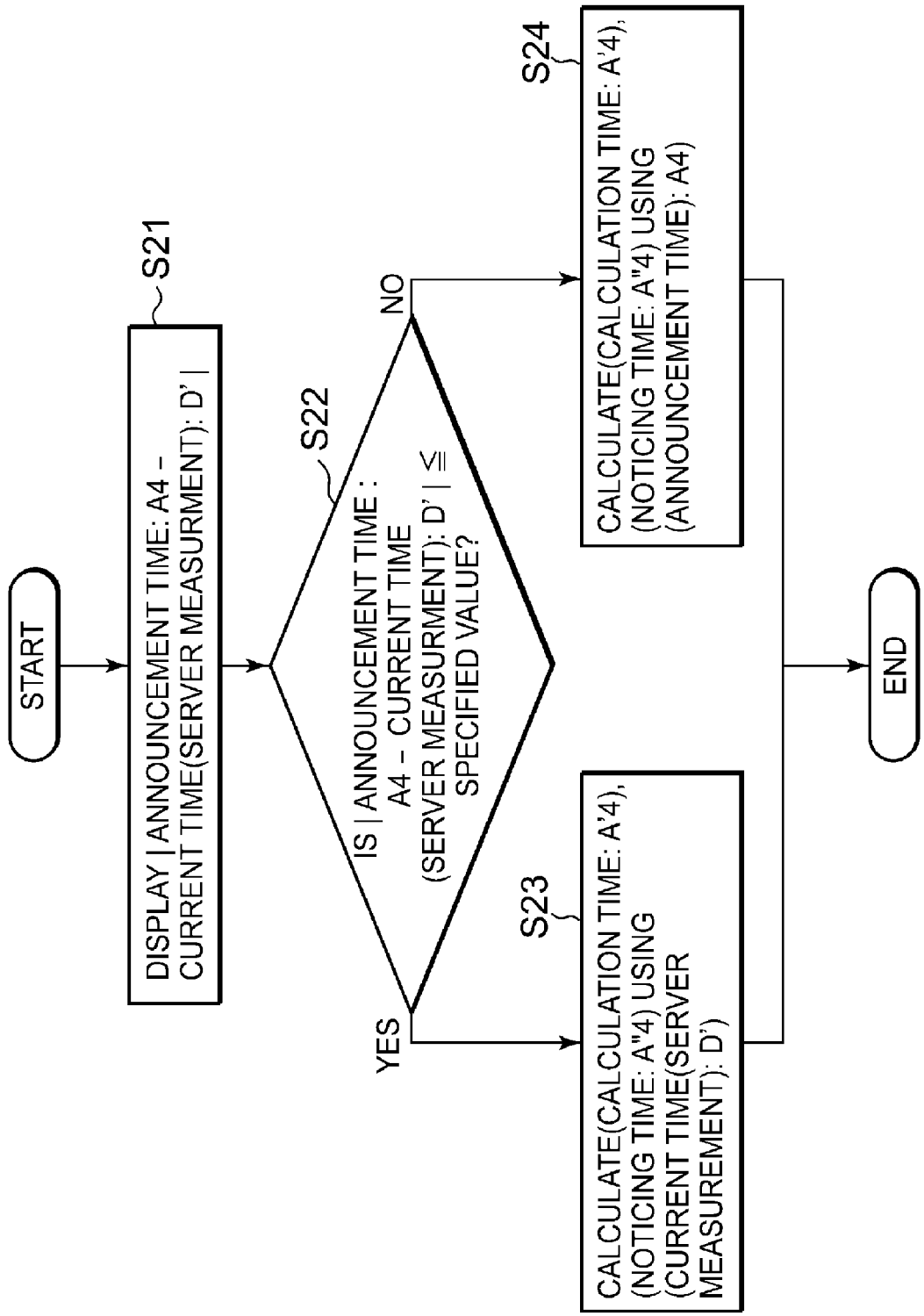
FIG. 14 is a flow chart showing a routine when the disaster noticing server (100) calculates a calculation time: A' and a noticing time A".

As the method whereby the disaster noticing server (100) sets the (announcement time: A4), (calculation time: A'4) and (noticing time: A"4) at the disaster noticing server (100) automatically, the following methods shown in FIG. 14 may be used.

For example, the disaster noticing server (100) calculates the difference between the (announcement time: A4) and the (calculation time: A'4) (difference=|announcement time: A4−calculation time: A'4|) (Step S21), and determines whether the calculated difference exceeds a specified value (permitted number of seconds error is set) (if difference≦specified value) (step S22). If the difference exceeds the specified value (difference>specified value), it is determined that there is an offset in the time measured by the disaster noticing server (100) (Step S22/No). Then, the disaster noticing server (100) sets the (announcement time: A4) automatically (Step S23), and transmits the set (announcement time: A4) to the disaster reporting terminal (200-1 to 200-*n*) together with the (expected arrival data: B) (Step S24). If the difference does not exceed the specified value (difference≦specified value), it is determined that the time measured by the disaster noticing server (100) is accurate (Step S22/Yes). Then, the disaster noticing server (100) sets the (noticing time: A"4) automatically (Step S25), and transmits the set (noticing time: A"4) to the disaster reporting terminal (200-1 to 200-*n*) together with the (expected arrival data: B) (Step S26).

A second embodiment of the present invention will be described in detail below.

Figure 15:
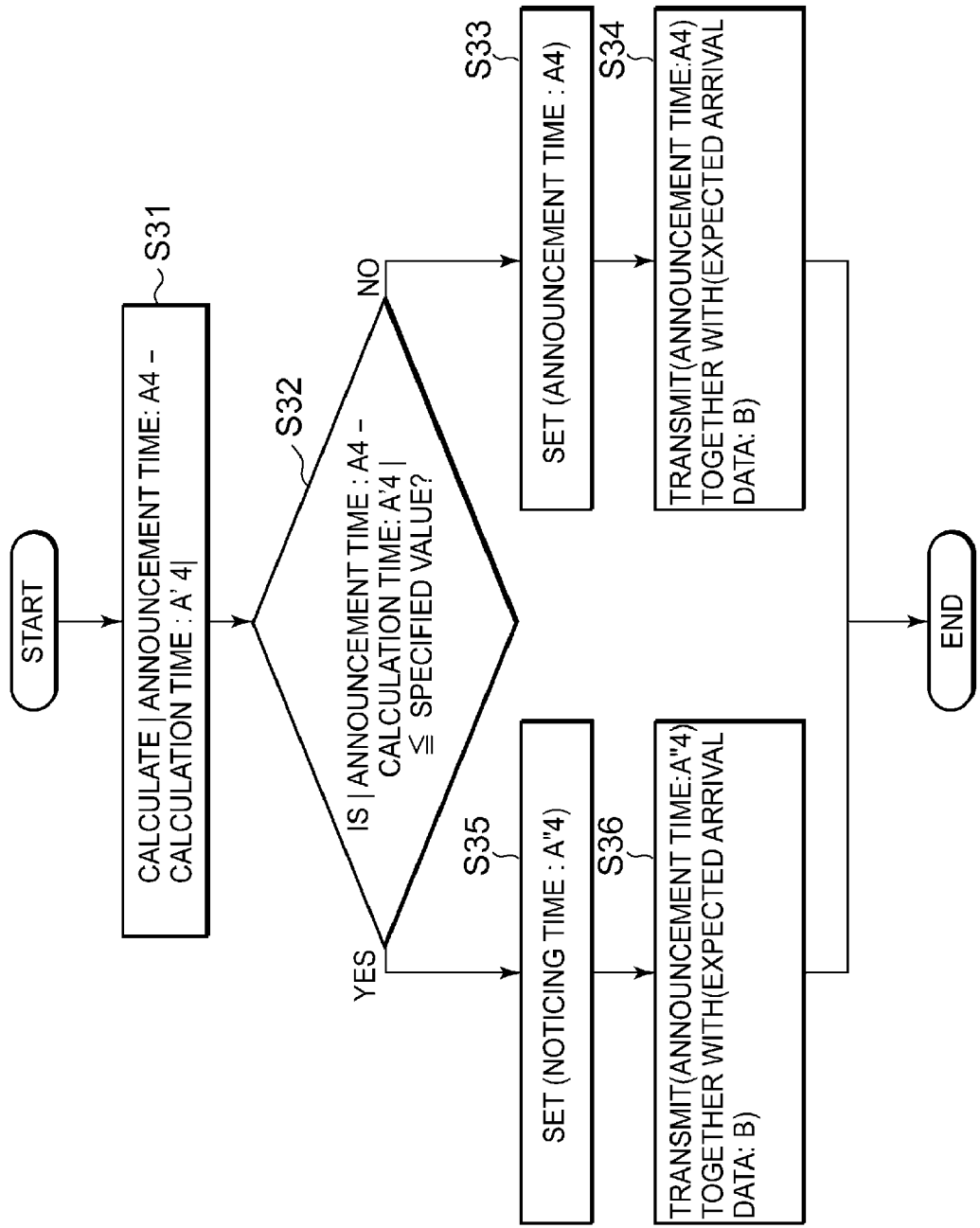
FIG. 15 is a flowchart showing a routine when the disaster noticing server (100) automatically sets either one of an announcement time: A4 and a noticing time: A"4.
Figure 16:
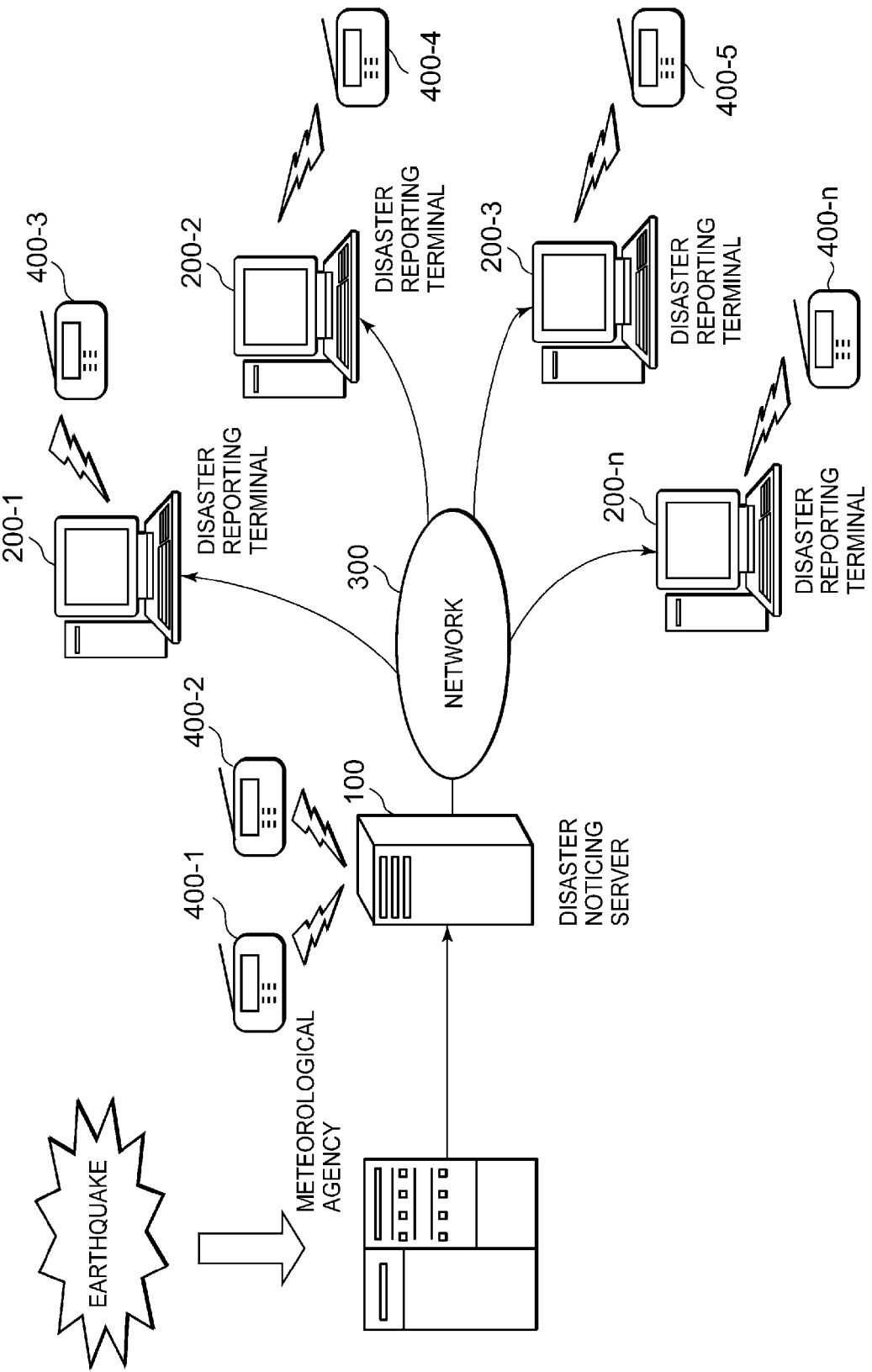
FIG. 16 is a diagram showing the configuration of a disaster noticing system according to a second embodiment.

The disaster reporting terminal (200-1 to 200-*n*) which constitutes the disaster information system of the first embodiment, displayed the (estimated seismic intensity: B2) and the (time remaining) on the display unit. The disaster reporting terminal (200-1 to 200-*n*) which constitutes the disaster information system of the second embodiment, as shown in FIG. 15, notifies the (estimated seismic intensity: B2) and the (time remaining) to a peripheral device (400-1~n: n is an integer) surrounding the disaster reporting terminal (200-1 to 200-*n*). Due to this, the peripheral device (400-1~n) surrounding the disaster reporting terminal (200-1 to 200-*n*) receives the (estimated seismic intensity: B2) and the (time remaining), so the (estimated seismic intensity: B2) and the (time remaining) can be displayed on the display unit of the peripheral device (400-1~n). The peripheral device may also be represented by a sub-terminal.

The disaster noticing server (100) may also notify the (estimated seismic intensity: B2) and the (time remaining) to the peripheral apparatus (400-1~n) surrounding the disaster noticing server (100). In this case, the aforesaid time remaining and estimated seismic intensity display program (2001) is installed in the disaster noticing server (100), and the aforesaid (time remaining) is calculated by the disaster noticing server (100).

The construction of the peripheral apparatus (400-1~n) according to this embodiment is not particularly limited, and for example, it may have the ability to receive FM waves, so that a voice message is played automatically when a predetermined command is received. In this example, the (estimated seismic intensity: B2) and (time remaining) are transmitted to the peripheral apparatus (400-1~n) by FM radio together with a predetermined command from the disaster noticing server (100) or disaster reporting terminal (200-1 to 200-*n*). When the peripheral device (400-1~n) receives the predetermined command, the (estimated seismic intensity: B2) and the (time remaining), the (estimated seismic intensity: B2) and (time remaining) are automatically notified by a voice message.

The invention has been described above referring to the above preferred embodiments, but it should be understood that the invention is not be construed as being limited in any way thereby, various modifications being possible to the extent that they do not depart from the scope and spirit of the invention.

For example, the disaster reporting terminal (200-1 to 200-*n*) may also be configured so that the (estimated seismic intensity: B2) and the (time remaining) are not displayed on the display unit, but instead notified by a voice message.

Also, the control routine constituting the disaster information system in the aforesaid embodiments may be performed by hardware, software, or a combination of both.

When the processing is performed by software, a program on which the processing sequence is recorded can be installed in a memory of a computer built into dedicated hardware and executed, or a program can be installed in a general-purpose computer that can perform various processing, and executed. For example, the program can be pre-recorded on the hard disk or ROM (Read Only Memory) as a recording medium. The program can be temporarily or permanently stored (recorded) on a removable recording medium such as a floppy (registered trademark) disk, CD ROM (Compact Disc Read Only Memory), MO (Magneto optical) disk, DVD (Digital Versatile Disc), magnetic disk, or semiconductor memory. Such a removable recording medium can be provided as a "software package".

The program may be installed in a computer from the aforesaid removable recording medium, or transferred by wireless from a download site, or transferred by cable to a computer via a LAN (Local Area Network) and the Internet, or the transferred program may be received by a computer, and installed on a recording medium such as an internal hard disk.

The operations described in the above embodiments are not necessarily performed in time sequence, but can be performed in parallel or individually depending on the processing capacity of the processing device or the requirements. The disaster information system described in the aforesaid embodiments may also be a logical integration of plural devices, and these devices may be installed in the same cabinet.

The system configuration is not particularly limited to that described in the aforesaid embodiments, various other configurations being possible.

For example, the disaster noticing server (100) may be installed at the head office of a company, etc., and the disaster reporting terminal (200-1 to 200-*n*) installed in a branch office or local office, these being connected by an in-house network. Due to this construction, the company can be given information about an earthquake promptly. The disaster information system according to this embodiment is also effective if used by public institutions, such as the police, fire fighters and schools. Alternatively, a service operator who provides earthquake information may introduce the disaster noticing server (100), and install the disaster reporting terminal (200-1 to 200-*n*) in a client company to provide a service.

While this invention has been described in conjunction with the preferred embodiments described above, it will now be possible for those skilled in the art to put this invention into practice in various other manners.

What is claimed is:

1. A system for providing a notice of a disaster comprising:
    at least one terminal;
    a server providing information related to said disaster for said terminal;
    wherein said server comprises:
        a first time measuring unit which measures a server current time,
        a first calculating unit which calculates an expected time of arrival of said disaster at said terminal in case said disaster happens,
        a checking time calculating unit which calculates a checking time for checking accuracy of a terminal current time, and
        a transmitting unit which transmits said expected time and said checking time to said terminal
    wherein said terminal comprises:
        a second time measuring unit which measures the terminal current time,
        a second calculating unit which calculates the time remaining until said disaster arrives at said terminal based on said expected time and said checking time,
    wherein said checking time calculating unit obtains said server current time when said disaster happens, calculates a first difference between said server current time and the time said disaster happened, and calculates said checking time based on said first difference if said first difference exceeds a first threshold, and
    wherein said second calculating unit obtains said terminal current time when receiving said expected time and said checking time, calculates a second difference between said terminal current time and said checking time, and calculates said remaining time based on said expected time and said terminal current time if said second difference does not exceed a second threshold, and calculates said remaining time based on said expected time and said checking time if said second difference exceeds said second threshold.

2. The system according to claim 1, wherein said terminal displays said time remaining.

3. The system according to claim 1,
    wherein said server calculates an impact of said disaster against a location of said terminal and transmits said impact to said terminal,
    wherein said terminal displays said time remaining and said impact.

4. A server providing information related to a disaster comprising:
    a time measuring unit which measures the current time of the server,
    a calculating unit that calculates an expected time of arrival of said disaster at a terminal in case said disaster happens;
    a checking time calculating unit which calculates a checking time for checking accuracy of a terminal current time measured by the terminal,
    a transmitting unit that transmits said expected time and said checking time to said terminal;
    wherein said checking time calculating unit obtains said server current time when said disaster happens, calculates a first difference between said server current time and the time said disaster happened, and calculates said checking time based on said first difference if said first difference exceeds a first threshold, and
    wherein said terminal calculates a time remaining until said disaster arrives at said terminal based on said expected time and said checking time, and calculates a second difference between said terminal current time and said checking time, and calculates said remaining time based on said expected time and said terminal current time if said second difference does not exceed a second threshold, and calculates said remaining time based on said expected time and said checking time if said difference exceeds said second threshold.

5. A terminal receiving information related to a disaster comprising:
    a receiving unit that receives an expected time of arrival of said disaster at said terminal and a checking time;
    a measuring unit that measures the terminal current time; and a calculating unit that obtains said terminal current time when receiving said expected time and said checking time, calculates a difference between said terminal current time and said checking time, and calculates said remaining time based on said expected time and said terminal current time if said difference does not exceed a threshold, and calculates said remaining time based on said expected time and said checking time if said difference exceeds said threshold.

6. The terminal according to claim 5, further comprising:
a displaying unit that displays said time remaining.

7. A method for providing a notice of a disaster from a server to at least one terminal comprising:
in a server:
  calculating an expected time of arrival of said disaster at a terminal in case said disaster happens;
  calculating a checking time for checking accuracy of a terminal current time
  transmitting said expected time and said checking time to said terminal;
in said terminal:
  measuring the terminal current time; and
  calculating the time remaining until said disaster arrives at said terminal based on said expected time and said checking time,
wherein calculating said checking time comprises determining a server current time when said disaster happens, calculating a first difference between said server current time and the time said disaster happened, and calculating said checking time based on said first difference if said first difference exceeds a first threshold, and
wherein calculating the remaining time comprises calculating a second difference between said terminal current time and said checking time, and calculating said remaining time based on said expected time and said current time if said second difference does not exceed a second threshold, and calculating said remaining time based on said expected time and said checking time if said difference exceeds said second threshold.

8. A computer readable medium embodying a program, said program causing a server to perform a method for providing a notice of a disaster from said server to at least one terminal, said method comprising:
  calculating an expected time of arrival of said disaster at a terminal in case said disaster happens;
  calculating a checking time for checking accuracy of a time measured by the terminal;
  transmitting said expected time to said terminal; and
  transmitting said checking time to said terminal,
  wherein calculating said checking time comprises determining a server current time when said disaster happens, calculating a first difference between said server current time and the time said disaster happened, and calculating said checking time based on said first difference if said first difference exceeds a first threshold, and
wherein said terminal calculates the time remaining until said disaster arrives at the said terminal based on said expected time and said checking time, and calculates a second difference between said terminal current time and said checking time, and calculates said remaining time based on said expected time and said terminal current time if said second difference does not exceed a second threshold, and calculates said remaining time based on said expected time and said checking time if said second difference exceeds a threshold.

9. A method for controlling a terminal, comprising:
  receiving an expected time of arrival of a disaster at said terminal and a checking time;
  measuring the terminal current time; and
  calculating the time remaining until said disaster arrives at said terminal based on said expected time and said current time;
  wherein calculating the remaining time comprises obtaining said terminal current time when receiving said expected time and said checking time, calculating a difference between said terminal current time and said checking time, and calculating said remaining time based on said expected time and said terminal current time if said difference does not exceed a threshold, and calculates said remaining time based on said expected time and said checking time if said difference exceeds said threshold.

10. A computer readable medium embodying a program, said program causing a terminal to perform a method, said method comprising:
  receiving an expected time of arrival of a disaster at said terminal and a checking time;
  measuring a terminal current time; and
  calculating the time remaining until said disaster arrives at said terminal based on said expected time, said current time, and said checking time;
  wherein calculating the remaining time comprises obtaining said terminal current time when receiving said expected time and said checking time, calculating a difference between said terminal current time and said checking time, and calculating said remaining time based on said expected time and said terminal current time if said difference does not exceed a threshold, and calculating said remaining time based on said expected time and said checking time if said difference exceeds said threshold.

* * * * *